US012762126B2

(12) United States Patent
Clague et al.

(10) Patent No.: US 12,762,126 B2
(45) Date of Patent: Oct. 13, 2026

(54) FUNCTIONAL TYPED PROGRAMMING WITH VISUAL ARTIFICIAL INTELLIGENCE DEVELOPMENT INTERFACE

(71) Applicant: Inter Alia LLC, Los Angeles, CA (US)

(72) Inventors: Douglas Clague, Auckland (NZ); Duncan Nimmo, Wellington (NZ); Lincoln Gasking, Los Angeles, CA (US); Jeremy Fernsler, Los Angeles, CA (US); Jacob Aust, Santa Clarita, CA (US); Dominic J. D. Hughes, Menlo Park, CA (US)

(73) Assignee: Inter Alia LLC, Los Angeles, CA (US)

( * ) Notice: Subject to any disclaimer, the term of this patent is extended or adjusted under 35 U.S.C. 154(b) by 0 days.

(21) Appl. No.: 19/559,701

(22) Filed: Mar. 6, 2026

(65) Prior Publication Data

US 2026/0267858 A1 Sep. 10, 2026

Related U.S. Application Data

(60) Provisional application No. 63/769,619, filed on Mar. 10, 2025.

(51) Int. Cl.

| | |
|---|---|
| ***G06F 9/44*** | (2018.01) |
| ***G06F 3/04847*** | (2022.01) |
| ***G06F 16/21*** | (2019.01) |
| ***G06F 16/2455*** | (2019.01) |

(52) U.S. Cl.
CPC ...... *G06F 16/2455* (2019.01); *G06F 3/04847* (2013.01); *G06F 16/219* (2019.01)

(58) Field of Classification Search
CPC ............... G06F 16/2455; G06F 16/219; G06F 3/04847; G06Q 30/0201; G06N 3/08; G06N 5/04; G06N 3/0475; G06N 20/00; G06N 3/047; G06N 3/049; G06N 3/088
See application file for complete search history.

(56) References Cited

U.S. PATENT DOCUMENTS

2022/0124543 A1* 4/2022 Orhan .................... G06N 3/006

* cited by examiner

*Primary Examiner* — Chuck O Kendall
(74) *Attorney, Agent, or Firm* — Knobbe, Martens, Olson & Bear, LLP

(57) ABSTRACT

A graphical user interface provides interactive control over configuring a workflow comprising multiple functions, enforcing matching of data types for output of a function to be input into another function. At least one function executes a generative artificial intelligence model to generate nondeterministic output. A graph-based representation of the workflow is generated, including multiple versions and iterations of executing the workflow. The graph-based representation enables return to a prior version or iteration, allowing generation of additional nondeterministic output based on the prior version or iteration, rather than a most-recently generated version or iteration. This enables iterative refinement and exploration of workflow outcomes.

20 Claims, 12 Drawing Sheets

301

302

FUNCTIONAL TYPED PROGRAMMING WITH VISUAL ARTIFICIAL INTELLIGENCE DEVELOPMENT INTERFACE

CROSS-REFERENCE TO RELATED APPLICATION

This application claims priority to U.S. Provisional Patent Application No. 63/769,619, filed Mar. 10, 2025, the contents of which are incorporated by reference herein.

BACKGROUND

Generally described, computing devices and communication networks can be utilized to exchange data or information. In a common application, a computing device can request content from another computing device via a communication network. For example, a client having access to a computing device can utilize a software application to request content from a server computing device via the network (e.g., the Internet). In such scenarios, the client's computing device can be referred to as a client computing device, and the server computing device can be referred to as a content provider.

Generally described, a large language model is a type of machine learning model that uses deep learning techniques to process large amounts of data such as text. Large language models may generate human-like text, answer queries, and perform natural language processing tasks. In some applications, the network service provider can instantiate various network-based services involving machine learning models that can process client requests for data. For example, network-based services related to query processing or question answering assistants (e.g., chatbots) can correspond to network-based services that interact with humans to provide output.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
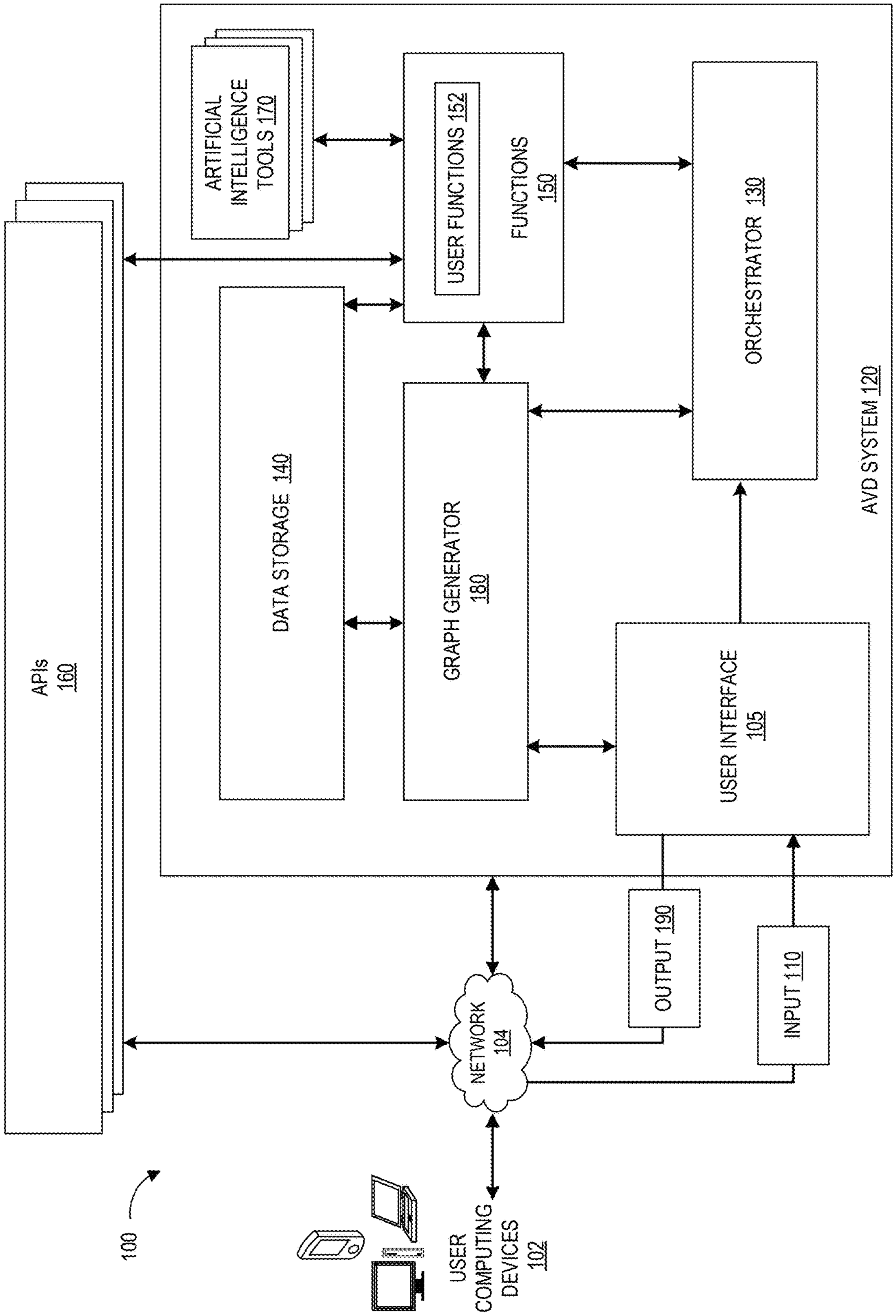
FIG. 1 depicts a schematic diagram of a network that implements an illustrative Artificial Intelligence-based Visual Development ("AVD") system for custom generation of artificial intelligence-based creative workflows or other applications in accordance with aspects of the present disclosure.

Generally described, aspects of the present disclosure relate to generative artificial intelligence (AI) models, including diffusion models and large language models (LLMs), and more specifically to systems and methods for simplifying and streamlining the processes involved from conception to deployment of generative AI-based workflows and other applications. An AI-based Visual Development system (hereafter "AVD system") is provided that implements a domain-specific language (DSL) designed to simplify and streamline the end-to-end process of model conception and deployment.

The AVD system may facilitate creation and execution of custom AI-based workflows and other applications, graphical and visual representations of these AI-based workflows/applications/flows, and the corresponding creative content from these workflows/applications. For example, an AVD system may output: 1) an AI-based workflow that generates content (e.g., a haiku), 2) a graphical representation (e.g., tree graph) of the AI-based workflow that generates the content, and 3) the content written by this AI-based content generation workflow. In some embodiments, the AVD system includes various tools for use in generating custom AI-based creative workflows or other applications with large language model (LLM) agents, including custom functions, AI tools, application programming interfaces (APIs), a graph generator, and a visual DSL-based user interface (UI) for developers.

An LLM is a type of machine learning model that uses AI to generate human-like text in response to various types of input. LLMs are generative AI models trained on large amounts of text data in order to generate new content. LLMs may be instantiated and executed on any number of computing devices. In some examples, an LLM may use an autonomous AI-based agent (referred to herein simply as an "agent" for brevity) in order to interact with various tools and APIs. An agent may be understood as an AI-based system with one or more AI components (e.g., an LLM instance) and additional interfacing code (e.g., an HTTP interface) that allows the output of the LLM instance in a given format (e.g., HTTP GET/POST) to result in a corresponding programmatic call to another agent, tool, or API. The programmatic call may include an executable command, a request for information, another directive, or a combination thereof. The agent may receive a response to the programmatic call and perform additional processing, such as inputting the response back into the LLM instance, storing the response in a data store, sending the response to another agent or system, or the like.

Current methodologies for developing, training, and deploying LLMs and other generative AI models and agentic systems are highly complex and resource intensive. These processes typically require a deep understanding of machine learning, data science, and software engineering, thereby limiting accessibility to a select group of experts. Furthermore, the significant computational resources required pose a substantial barrier for individuals, researchers, and organizations with limited access to such resources. Integration challenges with existing workflows and systems further exacerbate the issue, making it difficult to incorporate generative models seamlessly into broader applications.

The complexity and resource demands of generative AI models impede broader adoption and stifle innovation. Newcomers and those without specialized knowledge face significant hurdles, leading to a slower pace of development and application. Organizations and researchers with limited computational resources are often unable to fully leverage the potential of generative models, resulting in missed opportunities for advancements in various fields. The lack of seamless integration with existing workflows also leads to inefficiencies and increased costs, further discouraging the adoption of generative models.

Prior attempts at AI-based workflow generation involve dozens of prompts and tailored customization to generate a single workflow. Notably, development of such a workflow (e.g., with a chatbot) may not be flexible or dynamic, and past iterations of an AI-based workflow may not be compartmentalized in such a way that allows a developer to isolate a particular element of the system and iterate dynamically. Moreover, such systems may not be equipped with the ability to dynamically evaluate the best generative AI model to use for a given function. Because of this lack of flexibility, generation of AI-based workflows can require teams of professional programmers, often taking weeks or months to complete at notable expense. An extensive and highly technical effort may be required by developers or programmers before the finalized code results in a production-ready application (e.g., a nondeterministic system using AI). While such teams may use machine learning technology to develop and automate certain targeted workflows, such automation efforts lack flexibility due to being narrowly defined and may also suffer accuracy and latency challenges.

Prior attempts at creating new content and systems with generative AI (e.g., text, images, video, and more) also have significant limitations. Such limitations include narrow scope: tools may focus on generating images but offer little flexibility to handle diverse data types or integrate real-time feedback across tasks. Another limitation is lack of scalability: existing solutions may be tuned in such a way that they do not scale across industries or support complex applications beyond basic content generation. For example, one technical limitation with existing systems is the limited context window. Complex multi-step processes are not able to be prompted because the more information that is added to the context window of an LLM, the worse it performs.

The systems and methods disclosed herein simplify the development of complex AI-based workflows and other applications by using machine learning models and real-time data to manage and apply AI models dynamically within abstracted functions. The AVD system may be designed with a generative model-agnostic architecture (e.g., a programming layer that abstracts away the details of specific diffusion and LLM tools). Users may seamlessly swap between different tools for tasks such as text generation, image creation, and video editing.

The AVD system prioritizes ease of use without compromising on the depth and flexibility required for cutting-edge generative modeling. An intuitive syntax and high-level constructs abstract away the complexities of underlying machine learning algorithms and hardware optimizations, making advanced AI more accessible. For example, the AVD system may provide certain dynamic predefined functions and capabilities accessible in a visual programming interface. Advantageously, the visual programming interface may enforce data typing requirements for input/output and programmatic calls among agents and functions (also referred to herein as "enforced matching"). For these reasons, among others, a "non-technical" (e.g., not a developer or programmer) user of an AVD system with little or no technical understanding of computer code may nonetheless build AI-based workflows or other applications for their specific use cases in real time as the need arises in businesses or other creative efforts.

Generative AI models provide many opportunities to advance present technology in creative storytelling industries, such as the film industry and video game industry. Often, the users of such technologies that would be best positioned to make use of such advances in machine learning are the creative teams of writers and directors themselves. With an AVD system, a user from a creative team who writes screenplays and has never written code is able to build an AI-based workflow for their screenplay writing and ideation process. For example, a screenwriter may want to be able to quickly and automatically generate a storyboard for the text of a screenplay they have written. Such a capability would allow the screenwriter to quickly visually communicate the key points of the story at a high level to multiple types of audiences who have never read the screenplay. A screenwriter could iteratively use an AVD system to generate an AI-based workflow to leverage generative AI to build such storyboards. In this way, an AVD system improves upon existing technologies by abstracting away the technical details of computer code and allowing all types of users to build computer programs that leverage the power of AI in their various processes. More specifically, an AVD system may make technical processes such as developing complex agentic systems available to users in creative fields and other non-technical users. An agentic system may be an AI-based system designed to make decisions and take action towards specific goals with minimal or no human intervention. Agentic systems may exhibit autonomous behavior based on sensing, processing, decision-making, and action taking capabilities of computing systems. Agentic systems may leverage AI, machine learning, reinforcement learning, adaptive heuristics, and rule-based algorithms to perceive environmental inputs and infer contextual meaning used to dynamically inform decisions based on real-time data. The agentic systems of an AVD system may scale to industries as varied as healthcare, finance, education, and entertainment, with real-time feedback and the capability to automate even organizational workflows.

Unlike traditional frameworks that separate the development environment from the execution engine, the AVD system in some embodiments incorporates an interactive mode akin to eager execution. This feature allows immediate feedback and real-time adjustments, facilitating an exploratory and iterative development process that is particularly beneficial in the creative and experimental phases of model design.

The AVD system provides modularity and flexibility in constructing and adjusting model architectures. In some embodiments the AVD system uses a dynamic graph execution system which adapts in real-time to changes in workflow structure or data flow. This allows users to seamlessly swap, modify, or extend components of their workflows. Users may also tap into a library of pre-built components for diffusion models, LLMs, and other generative architectures. Advantageously, graph-based representations of workflows and other applications generated by the AVD system provide powerful versioning and iteration features that allow users to modify particular elements of a workflow, assess the effect of the modifications on the overall workflow or output, and dynamically iterate until a desired output is obtained. The graph-based representations additionally preserve the ability to return to prior versions of the workflow and dynamically iterate in other ways. Leveraging graph execution and optimization techniques further facilitates improved efficiency in resource use and performance, whether running on central processing units (CPUs), graphics processing units (GPUs), or distributed computing environments.

As will be appreciated by one of skill in the art in light of the present disclosure, embodiments disclosed herein improve the ability of computing systems to configure, execute, and iteratively refine complex, multi-stage workflows that incorporate probabilistic machine learning models, and heterogeneous data types, while maintaining reliability and operational transparency during runtime. Moreover, the presently disclosed embodiments address technical problems inherent within computing systems; specifically, the difficulty of composing and executing multi-function workflows without runtime type-mismatch failures, the inability to efficiently manage and reproduce non-deterministic execution outcomes across multiple runs, the challenge of maintaining traceability between generated outputs and the computational states and dependencies that produced those outputs, and the overhead associated with coordinating multi-modal transformations and external tool invocations within a single executable workflow. These technical problems are addressed by the various technical solutions described herein, including a typed visual programming interface that enforces data-type compatibility between connected functions, graph-based workflow representations that persist version and iteration history and support selective checkpointing and re-execution of workflow portions, and a unified execution framework for type-aware orchestration of multi-modal functions and generative model calls. Thus, the present disclosure represents an improvement in computer-related technology and in the operation of computing systems that execute workflow-based applications involving machine learning models and heterogeneous data.

More specifically, the AVD system provides for generating, configuring, executing, and iterating AI-based workflows using a visual development environment that represents workflow logic as a plurality of functions and connections therebetween. The visual development environment may operate as a typed visual programming language that enforces data-type compatibility between outputs and inputs of connected functions. By enforcing type correctness at the user interface level, the system can reduce runtime configuration errors, improve reliability of workflow construction, and enable users to compose complex workflows without writing source code.

In some embodiments, the disclosed system provides a generative model-agnostic programming layer that abstracts implementation details of particular generative AI tools and permits workflows to invoke different models for a same logical task. For example, a workflow may be configured to select among multiple large language models, diffusion-based image generators, or other generative tools, and to substitute one tool for another without requiring reconstruction of the workflow. In certain embodiments, the system further supports comparative evaluation of tools within a workflow, such as by executing alternative model selections to determine which model produces preferred outputs for a given function, task, user, or context.

In some embodiments, the disclosed system is configured to support non-deterministic execution of workflows, including workflows that call probabilistic models that may produce different outputs for the same inputs. The system may store and present an execution history that distinguishes between versions of a workflow configuration and iterations of executing a given version, thereby enabling a user to generate multiple samples of content from a single version while also enabling the user to modify the workflow to create a new version. In some embodiments, the system enables selective freezing, checkpointing, or re-execution of portions of a workflow such that a user can preserve intermediate results from one or more upstream functions while re-running one or more downstream functions to explore alternative non-deterministic outcomes.

In some embodiments, the disclosed system is configured to support cross-domain, multi-modal content generation and integration within a unified workflow execution framework. For example, a workflow may receive, produce, and pass among functions multiple heterogeneous data types including text, images, audio, video, three-dimensional content, structured records, and combinations thereof, such that outputs of one modality are transformed into inputs for another modality via intermediate functions. In certain embodiments, the system provides type-aware function interfaces and conversion operations that enable workflows to coordinate and synchronize operations across disparate domains and modalities, including by invoking different specialized generative models or analytic tools for respective modalities. In this way, the system enables end-to-end, multi-step applications in which, for example, textual source material is processed to derive scene descriptions and entity attributes, those attributes are used to generate image prompts and corresponding images, and the generated assets are further processed, assembled, or transformed into downstream deliverables, without requiring a user to manually reformat data or switch among separate tools.

In some embodiments, the disclosed system generates and maintains a graph-based representation (sometimes referred to herein as a "flow") that records workflow structure, dependencies, user-defined subgraphs, inputs, parameters, intermediate states, and outputs produced across versions and iterations. Such a graph-based representation may be stored in a nested manner such that outputs produced by a workflow can be traced to prior workflow states and to constituent subgraphs that generated those outputs. In this way, the system can provide transparency and traceability for generated assets, facilitate auditing and debugging of workflow behavior, and allow users to revisit prior workflow states to reproduce or modify results.

In some embodiments, the disclosed system supports profile-driven customization of workflow behavior and outputs. For example, the system may maintain one or more profiles associated with users, teams, projects, roles, or creative contributors, and may apply profile data as context, constraints, or parameters used by functions of a workflow. In certain embodiments, profile data can be updated over time based on user interactions, selections, and feedback, thereby enabling the system to adapt workflow execution to evolving preferences and to improve alignment of generated outputs with user- or project-specific objectives.

In some embodiments, the disclosed system provides interactive graph-based visualization and versioning functionality. For example, the system may display workflows and/or workflow histories as interactive graphs that can be navigated, inspected, and modified, including by adding, deleting, reconnecting, or reconfiguring functions. In certain embodiments, the visualization supports branching and return-to-prior-state operations, thereby enabling a user to compare outputs across iterations, return to a prior version or iteration, and generate new outputs based on the prior version or iteration rather than only a most recent workflow state.

In some embodiments, the disclosed system provides an interface that is configurable to accommodate different skill levels and interaction modalities. For example, the system may provide a visual node-and-connection interface for composing workflows, while also supporting higher-level abstractions that simplify workflow creation for non-technical users. In certain embodiments, the system can incorporate automated feedback loops and real-time execution feedback such that users can rapidly test, adjust, and refine workflow structure, parameters, and model selections in an iterative manner.

Various aspects of the disclosure will now be described with regard to certain examples and embodiments, which are intended to illustrate but not limit the disclosure. For example, various aspects of the present application will be discussed sequentially and in combination. However, each of the individual aspects may be individually implemented or combined with other implementations, without limitation. Although aspects of the present disclosure will be described with regard to illustrative network components, interactions, and routines, one or more aspects of the present disclosure may be implemented in accordance with various environments, system architectures, customer computing device architectures, and the like. Similarly, references to specific devices, such as a user computing device, can be considered to be general references and not intended to provide additional meaning or configurations for individual user computing devices. Accordingly, the disclosed examples are illustrative in nature and should not be construed as limiting unless specifically indicated.

Example Implementation Environment

Turning now to the figures, FIG. 1 depicts a block diagram of an example environment 100 implementing an AVD system 120 in the context of a network 104. Illustratively, the AVD system 120 may generate a variety of output 190 based on the input 110 to the AVD system 120. For example, the output 190 of the AVD system 120 may include a "flow" (e.g., an AI-based workflow or a configuration for an AI-based system, workflow, or application), a graphical representation of the flow, content generated by the flow, or any combination thereof. In this way, the AVD system 120 produces output 190 that allows a user of the AVD system 120 to isolate a particular element of the AVD system 120 (e.g., within the graphical representation of the flow), make dynamic adjustments to the flow, and dynamically iterate through various samples of nondeterministic content according to their preferences, as will be discussed in further detail with reference to FIG. 2A.

In some embodiments, the AVD system 120 may operate as a functional vector-processing language for a fixed, non-extendable set of high-level data types (e.g., strings, images, movies, audio). The AVD system 120 may use collections polymorphism to apply operations to appropriate data structures (e.g., to ensure that operations only apply to relevant data types). For example, when appending a list of messages to a collection of chats, the AVD system 120 may default to a round-robin distribution, correctly placing each message in its respective chat rather than treating each message as a single operation or incorrectly merging lists. In some embodiments, the AVD system 120 may enforce strict type constraints during function composition. In this way, the AVD system 120 passes compatible outputs as inputs to other functions. For example, if a type is incompatible, the AVD system 120 may not link the type, thus preserving the benefits of a strongly typed language without sacrificing usability. In this way, the AVD system 120 may manage abstract types and facilitate high-level content creation.

In some embodiments, the AVD system 120 may be a fixed, non-extensible type system, meaning that the AVD system 120 may include a fixed set of types that are not extended within the language itself. For example, in some embodiments a user may not define new types composed of multiple primitives. The abstraction and high-level development (e.g., strict type system) of the AVD system 120 may serve to abstract type management and combinatorial operations, simplifying development and allowing users to focus on high-level content creation rather than low-level data handling.

The AVD system 120 may make use of a variety of artificial intelligence tools 170 and various application programming interfaces 160 (hereafter "APIs 160") by calling functions 150. In some embodiments, the AVD system 120 generates output 190 responsive to a prompt, task, or media file obtained via input 110. The AVD system 120 may use a graph generator 180 to generate a graph of nodes that logically and visually represents the output 190 (e.g., a tree graph depicting a flow, as will be discussed in further detail herein). A user interface 105 may display the graph, and receive user interactions with the graph (e.g., additions, deletions, or modifications to the graph, representing modifications to the application), as described in greater detail herein. Data, including output 190 of an AVD system 120, may be stored in data storage 140.

As described herein, input 110 can also include additional input information, such as imagery, video files, audio recordings, historical information, profile information, geographic identifiers, and the like. Additionally, input 110 can also include information captured that can identify the desired creative tone, aesthetic, genre, appearance, or qualities of the generated output. The various aspects associated with the AVD system 120 can be implemented as one or more components that are associated with one or more functions, services, or machine learning models, among other components.

The user computing devices 102 in FIG. 1 may connect to the AVD system 120 via a network 104, or AVD system 120 can reside on the user computing device 102. The user computing devices 102 may have at least one processor. That processor may be in communication with a non-transitory computer-readable memory for maintaining computer-executable instructions. The user computing devices 102 may be physical or virtual. The user computing devices 102 may be mobile devices, personal computers, servers, or other types of devices. The user computing devices 102 may have a display, speakers, or other output devices and input devices through which a user can interact with the user interface 105.

The network 104, as depicted in FIG. 1, connects the devices and modules of the environment 100. The network can connect any number of devices. The network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long-Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

An API 160 may be understood as an interface and/or communication protocol between a client and a server, such that if the client makes a request in a predefined format, the client should receive a response in a specific format or initiate a defined action. APIs 160 may have specific locations within the API allowing for clients to interact with an API resource, and this specific location may be called an API endpoint. API endpoints may be URLs acting as the point of contact between the API client and the API server. In some embodiments, APIs 160 may exist outside of the network 104 and/or connect to the network 104.

An AVD system 120 may include data storage 140 (e.g., databases, data stores, etc.) accessible to the various components of the AVD system 120 for storage of data related to the functioning of the AVD system 120. Illustrative storage may be virtualized (e.g., in a cloud computing network) and/or physical, including hardware (various types of processors, local memory, random access memory ("RAM"), hard-disk and/or solid-state drive ("SSD") storage).

An AVD system 120 may include a graph generator 180 which may generate graphical representations of the output 190 (e.g., AI-based workflows for creative tasks). Graphs generated by the graph generator 180 may comprise nodes representing various functions of flows. In this way, the graphs from the graph generator 180 may serve as a visualization tool for a user of the AVD system 120 to understand and make changes to a given generated creative workflow via its graphical depiction on the user interface 105.

An orchestrator 130 may include interfacing code that enables the orchestrator 130 to interact with other parts of the AVD system 120 (e.g., functions 150, AI tools 170, APIs 160). Illustratively, orchestrator 130 may include an HTTP interface that allows the output 190 of the orchestrator 130 matching a given format (e.g., HTTP GET/POST) to result in a network call to an API 160. Similarly, orchestrator 130 may dynamically orchestrate interactions with AI tools 170 of an AVD system 120. As discussed in more detail herein, AI tools 170 may include any generative AI machine learning model provided to the AVD system 120.

Illustratively, the AVD system 120 may include specialized functions 150 (e.g., user functions 152). The orchestrator 130 of the AVD system 120 may make function calls to functions 150 of the AVD system 120. These specialized functions 150 may be software tools with customized logic designed with the complex task of generation of creative workflows of the AVD system 120 in mind. Additionally, the functions 150 may be in communication with AI tools 170 for use in various creative generative tasks submitted to the AVD system 120.

Example AVD System Architecture

Figure 2A:
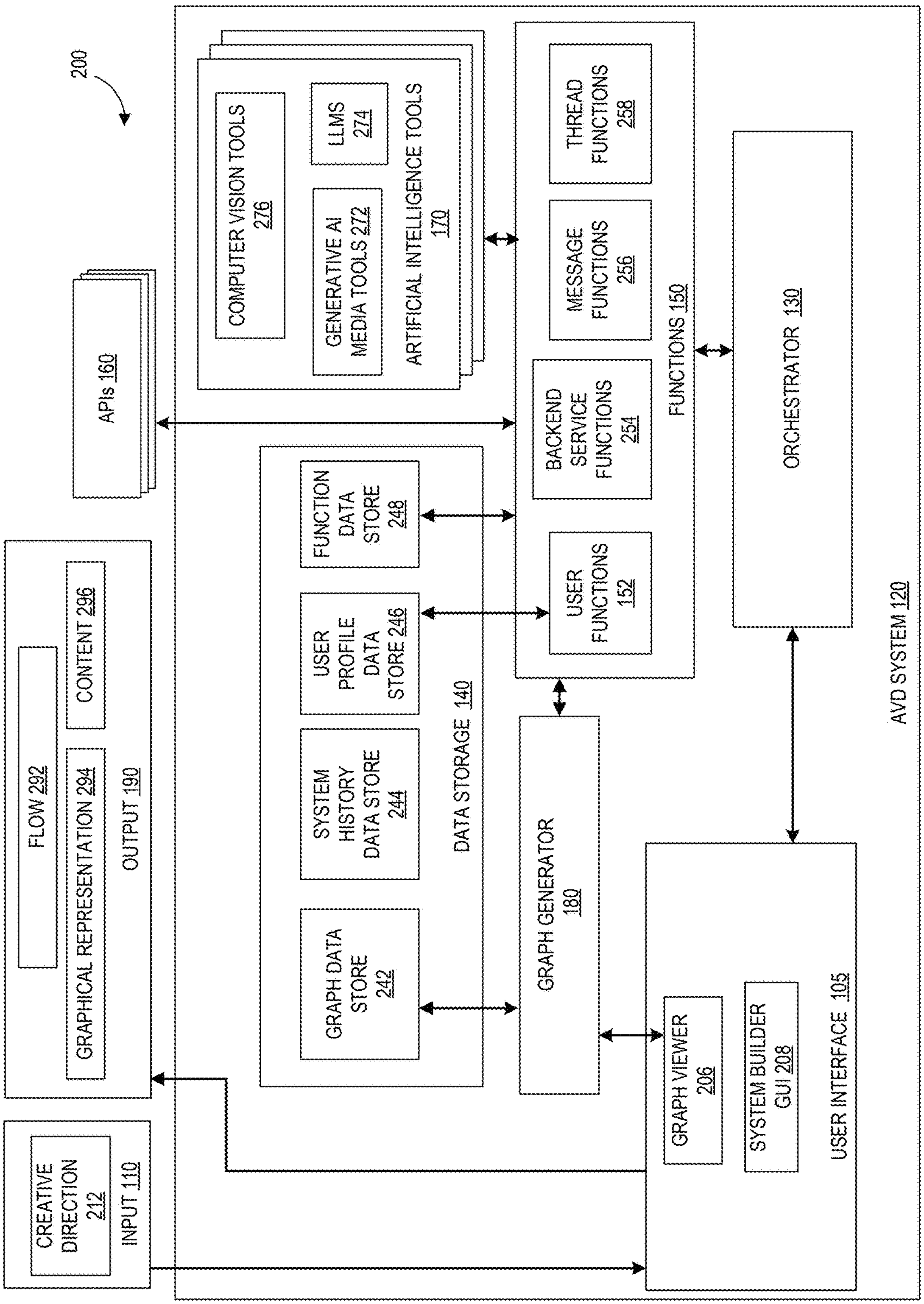
FIG. 2A is a more detailed schematic diagram of the environment of FIG. 1 depicting illustrative agents of an agent orchestrator, the various functions the agents may use in generating AI-based workflows ("flows") and corresponding content, a graph generator, data storage, and a user interface to receive creative direction as input and display output, in accordance with aspects of the present application.

FIG. 2A is a diagram 200 depicting a more detailed view of an AVD system 120 that generates a variety of output 190 based on the creative direction 212 of input 110 to the AVD system 120. For example, the output 190 of the AVD system 120 may include a flow 292 (e.g., an AI-based workflow that takes the form of a configuration for an AI-based system, workflow, or application), a graphical representation 294 of the flow 292, content 296 generated by the flow 292, or a combination thereof. In this way, the AVD system 120 produces output 190 that allows a user of the AVD system 120 to isolate a particular element of the AVD system 120 (e.g., within the graphical representation 294 of the flow 292), make dynamic adjustments to the flow 292, and dynamically iterate through various samples of nondeterministic content 296 according to their preferences, as discussed in further detail herein.

In some embodiments, a flow 292 may cycle through many intermediate "iterations" of the workflow before serving finally as output 190. The AVD system 120 may produce a first iteration of a flow 292 with a certain configuration of functions. Then, based on creative direction 212 received as input 110 (e.g., either one-time input or iterative, conversation-based input), the AVD system 120 may produce a new second iteration of the flow 292, thus modifying the original first iteration of the flow 292 to better suit the purposes at hand. Moreover, each iteration of a flow 292 may have a corresponding iterative graphical representation 294. The AVD 120 may store the graphical representation 294—or data defining the graphical representation 294—of each iteration or any subset thereof, allowing users to return to any iteration for re-execution or modification. In some embodiments, storage of a graphical representation 294 (or data defining a graphical representation) may include storage of state information for induvial components of a workflow so that an iteration can be re-visited in the same state as when it was originally generated and executed. For example, the values of internal parameters of the various models and other components of the workflow, reached during execution of the workflows on input 110, may be maintained in a serialized format that can be deserialized for re-execution at a later time. Advantageously, storage of such state information allows non-deterministic workflows and applications to be re-executed from a previously reached state. Moreover, the iterative development process allows users to iteratively modify one or more aspects of the workflow at a previously reached state in a manner that is not possible in flows that do not maintain state data.

For example, assume the AVD system 120 generates output 190 that includes: a flow 292 that writes a haiku (hereafter "haiku workflow"), a graphical representation 294 of that haiku workflow, and content 296 (e.g., the haiku generated by the haiku workflow). The AVD system 120 may generate many "iterations" of the haiku workflow before finally settling on the final, desired haiku workflow. Such iterations may represent, for example, additional functions being called, fewer functions being called, alternative functions being called, the same functions being called with different parameters, or functions otherwise being combined in different orders and configurations to generate different types of haiku output. For each iteration as the AVD system 120 receives further input 110 about the desired haiku workflow, a new iteration of the haiku workflow and a new iteration of the graphical representation 294 of that haiku workflow are output by the AVD system 120.

Figure 3A:
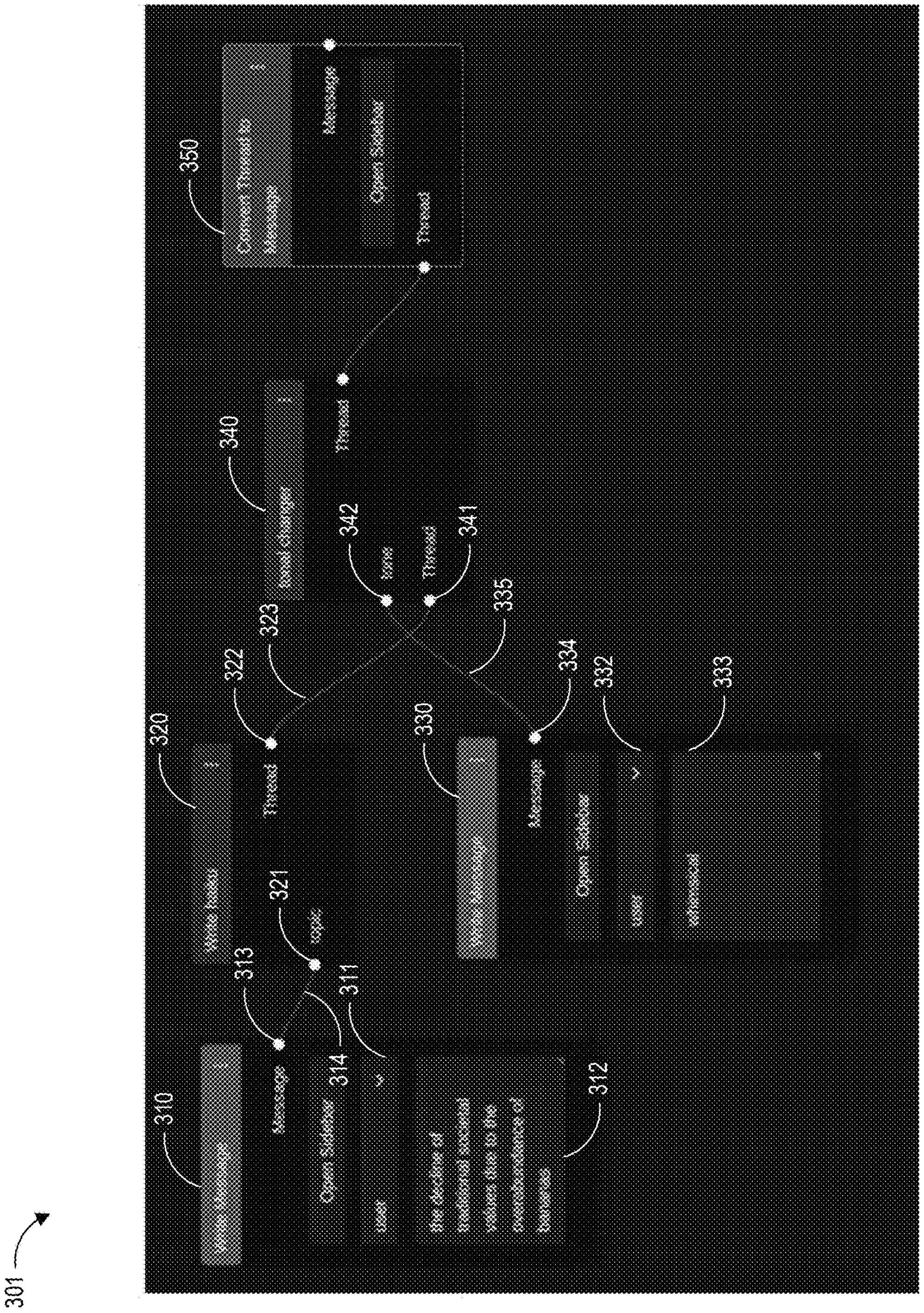
FIG. 3A is a depiction of an illustrative user interface displaying a creative application generated by an AVD system, in accordance with aspects of the present application.
Figure 3B:
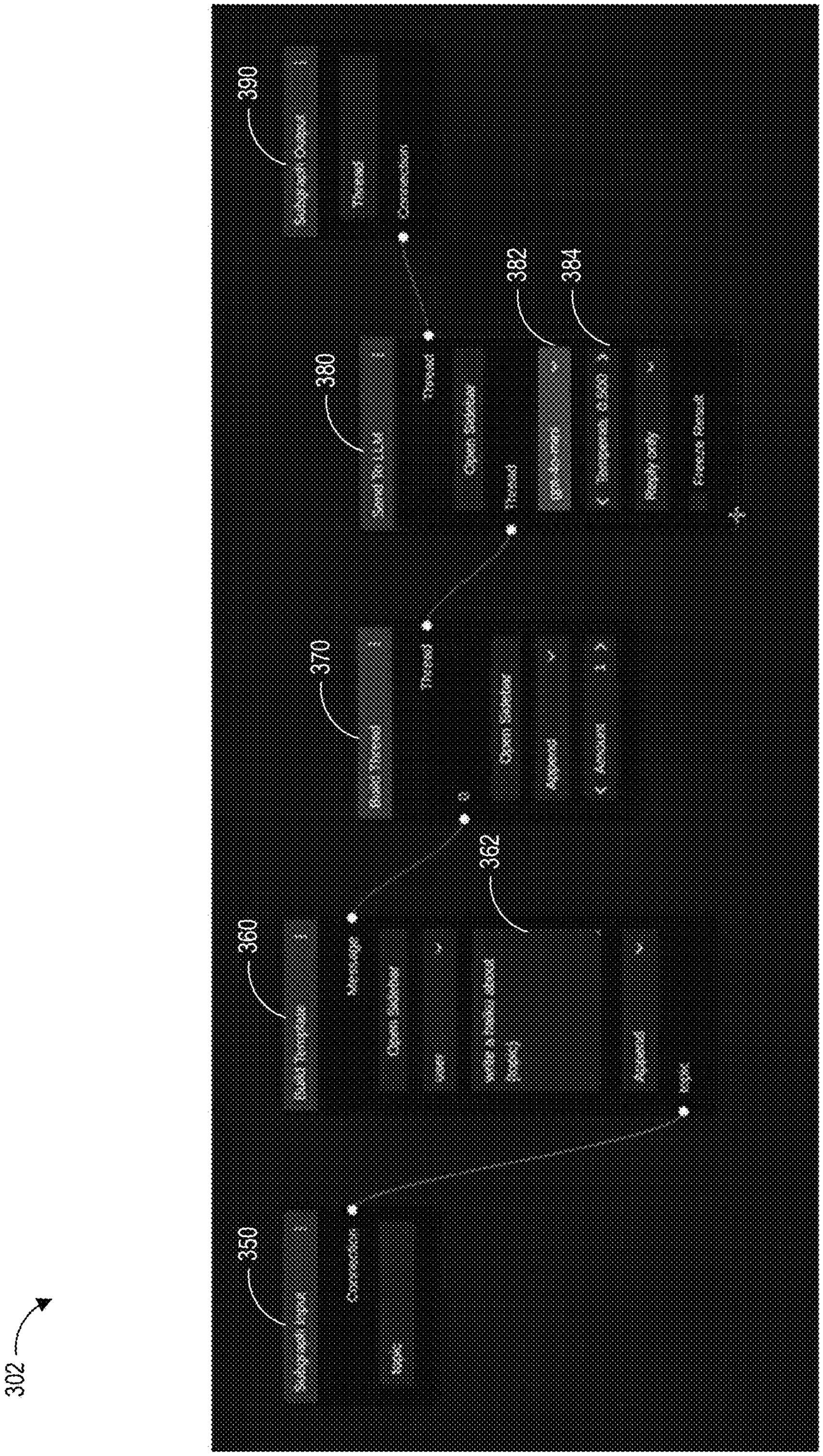
FIG. 3B is a depiction of an illustrative user interface displaying a user function from FIG. 3A, in accordance with aspects of the present application.

Moreover, a single version of a flow 292 may execute any number of iterations to generate samples of content 296 output by the flow based on the non-deterministic nature of certain functions that may be used (e.g., functions generating LLM-based content). For example, in response to input 110, the AVD system 120 may execute the first version of the above-referenced haiku workflow three times (three iterations). Thus, the same haiku workflow may non-deterministically generate three different haikus (e.g., three samples of content 296). In some embodiments, a history graph is used to maintain each version and iteration of the flow 292, including all samples of content 296 generated by iterations of the flow 292. For example, the history graph for the haiku workflow may include metadata referencing all functions that were part of the workflow for a particular version, and all inputs and all parameters for those functions. The history graph may also include all three haikus output by the particular version of the haiku workflow during the three execution iterations of the version. When modifications are made to the workflow (e.g., different data is input, modifications are made to functions, etc.), the history graph may be updated to include a new version of the workflow and to maintain information for each iteration (e.g., the output produced during each iteration). Examples of graph-based representations of workflows are illustrated in FIGS. 3A and 3B and described in greater detail herein.

As shown in FIG. 2A, input 110 may be received by or provided to the orchestrator 130. The input 110 may consist of user input (e.g., in the form of creative direction 212) from a user computing device 102 through the user interface 105. Illustratively, a user interface 105 may include a system builder graphical user interface (GUI) 208, a graph viewer 206, other components, or any combination thereof.

A system builder GUI 208 of a user interface 105 may be displayed on the screen of a user computing device 102 and may illustratively provide high-level visual depictions of the complex inner workings of various elements of the functional typed programming language captured in the functions 150 of the AVD system 120. In this way, the system builder GUI 208 provides a visual programming language capability to the AVD system 120. This visual programming language capability of the AVD system 120 may enable users with little or no technical expertise (e.g., users that are not computer programmers or developers) to build complex computer applications (e.g., flows and systems) that utilize generative AI for creative tasks. These complex computer applications can be built by users that may possess particular creative skillsets (e.g., writers of screenplays, illustrators, etc.) to build their own computer programs that utilize the nondeterministic power of generative AI tools 170, even when such users have no experience writing computer code. For example, as will be discussed in further detail in connection with FIG. 2B, a writer of movie screenplays may generate a flow (e.g., a computer application, workflow, or system using AI, hereafter referred to simply as "flow") that provides multiple ideas for plots for a screenplay. The writer may then use the flow they built with the AVD system 120 to collaboratively enhance their ideation, creative process, and storytelling as they develop various aspects of the screenplay.

In some embodiments, the user interface 105 may also include a graph viewer 206. The graph viewer 206 may illustratively work with the system builder GUI 208 to provide to a user further visual context for their interaction with the AVD system 120. More specifically, the graph viewer 206 may display the graphical depictions created by the graph generator 180. As discussed in further detail herein, the graph generator 180 may create a graphical representation of the flow as well as its corresponding content generated by the flow at each iteration. More specifically, the graph generator 180 generates history graphs that visually depict the version and iteration history for a flow. These history graphs visually represent information about different iterations of a flow created with the AVD system 120, as well as layered logs of content from flows dependent on the input at a given iteration.

In some embodiments, the functions 150 of the AVD system 120 may comprise pre-programmed functions containing customized logic designed to support tasks that may occur amidst a flow of the AVD system 120. In this way, functions 150 may serve as flexible building blocks in the visual programming capabilities of the AVD system 120 that allow users to combine customized implementations of the functions 150 in any number of orders and arrangements to build any number of flows, applications, or programs (e.g., applications that leverage machine learning models for tasks related to creative ideation and output) and deliver them as part of the output 190 of the AVD system 120. Notably, a flow output by the AVD system 120 may subsequently be saved within the AVD system 120 as a new function 150. In some embodiments, such a new function 150 would appear as a "black box" option for use to subsequent users of the system. For example, assume the AVD system 120 generates a flow to write haikus. Afterwards, this haiku workflow may be saved as a new function 150 of the AVD system 120 (e.g., "write haiku"). Such a function may be presented to subsequent users as a "black box" function, meaning that they do not have to edit or understand any of the underlying functions 150 within the new "write haiku" function. Instead, "write haiku" may appear to subsequent users as an abstracted capacity of the AVD system 120. In this way, the AVD system 120 dynamically improves and adds to its own capability and functions 150 over time. In some embodiments, a new function like "write haiku" may be presented as a "black box" while still allowing an option for the user to edit the subcomponents (e.g., combination of functions 150) of the "write haiku" function.

In some embodiments, messages may be generated by assigning a conversational "role" (e.g., user role, assistant role, system role) to text composed with text nodes. For example, in order to generate a "system message," a system role may be assigned to text that internally directs the behavior of the orchestrator 130. In still another example, in order to generate a "user message," a user role may be assigned to text originating from a user of the AVD system 120. In some embodiments, the text that makes up messages may include words, sentences, paragraphs, symbols, and/or lists.

Figure 2B:
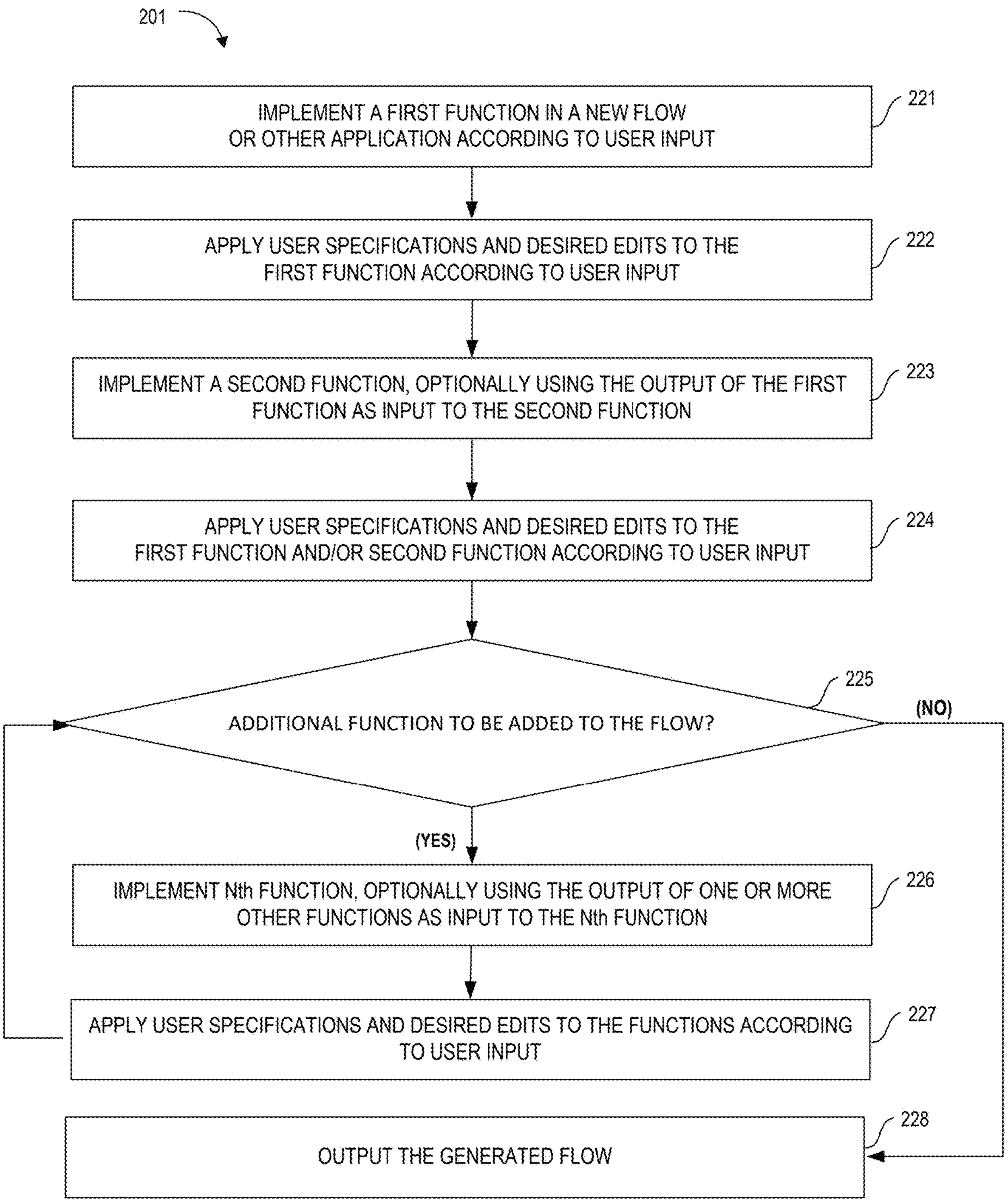
FIG. 2B is a flow diagram of a routine detailing the illustrative interactions of elements from FIG. 2A for generating creative workflows or other applications, in accordance with aspects of the present application.

As will be discussed in further detail in connection with FIG. 2B, illustrative functions 150 related to messages may be called message functions 256. In some embodiments, message functions 256 may include: a "Write Message" function, a "Load Message" function, a "Split Message" function, and a "Combine Message" function. For example, a "Write Message" function may provide the AVD system 120 with the capability to receive natural language instruction or input from a user. In another example, the "Load Message" function may provide the AVD system 120 with the capability to receive a file upload of various formats containing text or other natural language input. In another example, the "Split Message" function may provide functionality to split text (e.g., from a user or generated by the AVD system 120) at a designated marker (e.g., split a comma separated list into text fragments at each comma). In another example, a "Combine Message" function may provide backend logic that concatenates text fragments together according to user specifications.

In some embodiments, the AVD system 120 may include functions 150 directed towards input threads, message threads, or other data threads (e.g., prompt chains, chatbot conversations, multiple interactions within a conversation). As will be discussed in further detail in connection with FIG. 2B, illustrative functions 150 related to threads may be called thread functions 258. In some embodiments, thread functions 258 may include: a "Merge Thread" function, a "Split Thread" function, and a "Filter Thread" function. For example, the "Merge Thread" function may allow the AVD system 120 to combine two threads from different chat sessions and merge them into one input or file for a downstream function of the AVD system 120. Such a function may be helpful as context from different interactions with the AVD system 120 may need to be aggregated over time as new systems and workflows are generated, as will be discussed in further detail below. In another example, the "Split Thread" function may provide functionality for a user to split up a thread into distinct subsections and manipulate each subsection according to user specifications. In another example, the "Filter Thread" function may allow functionality to filter contents of a given thread on a given condition or set of conditions, returning only the relevant portions of the thread as output according to user specifications.

In some embodiments, the AVD system 120 may include functions 150 directed towards backend services (e.g., backend services of the AVD system 120 powered by AI tools 170, APIs 160, or other applications available to the AVD system 120). As will be discussed in further detail in connection with FIG. 2B, illustrative functions 150 related to backend functions may be called backend service functions 254. In some embodiments, backend service functions 254 may include: a "Split Document" function, a "Summarize Text" function, and a "Generate List" function. For example, a "Split Document" function may break down a large document into smaller chunks according to user specifications. In another example, the "Summarize Text" function may provide analysis regarding a summarization of text, documents, or other natural language inputs to the AVD system 120. In another example, a "Generate List" function may receive input (e.g., a screenplay, text of a book or story, etc.) and output a list according to user specifications (e.g., a list of characters in the screenplay or book). Further, an illustrative AVD system 120 may include functions such as "Generate Output" that allow a user to specify an output format (e.g., document type or file type) and formatting specifics for the output of the flow 292 generated by the AVD system 120.

In some embodiments, a particular type of backend service function 254 may be called a user function 152. A user function 152 may illustratively provide functionality that enables the AVD system 120 to enter a particular state reflective of a given user's preferences. For example, a user may log in to the AVD system 120, and their previous chat history and interactions with the AVD system 120 may be saved in the user profile data store 246. The user function 152 may access the user profile data store 246 to provide a customized state for creative generation according to that user's stated or demonstrated preferences. If a movie screenplay writer prefers that the AVD system 120 generate strong characters that demonstrate bold action, the AVD system 120 may have a stored user function 152 to apply prior to generating to all output 190 for this movie screenplay writer. For example, this stored user function 152 may include an LLM prompt instructing the LLM to "generate characters that demonstrate bold action." Illustratively, this prompt may even include past character examples generated by this movie screenplay writer that the writer indicated were preferable. Notably, a user function 152 may provide wide, flexible functionality with a number of different ways to apply states or context within prompts or functions 150 for a given user according to that user's particular needs and preferences. In some embodiments, the state used for a user function 152 may be part of a larger user profile saved for any given user. A user profile may collect various states and data related to a user and apply it as a preliminary step such that any output 190 is generated based on the state while that particular user is logged into their user profile. In this way, large organizations can use an AVD system 120 while providing custom experiences and output 190 for each user that logs in. Further, the customization of each user profile is dynamic and updated with every new choice a user makes, thus aligning with user preferences with higher and higher accuracy over time and usage.

In some embodiments, functions 150 may be considered sets of instructions for modular tasks or objectives to be implemented in various combinations. For this reason, functions 150 may be represented visually as nodes on the system builder GUI 208 and/or the graph viewer 206. For example, a system builder GUI 208 may display a set of functions 150 instantiated and chained together to accomplish a given task, and together this set of functions 150 may represent a flow. This same set of functions could also be viewed with the graph viewer 206 in graph form. Visual examples of such a UI can be found in FIGS. 3A-3B. In some embodiments, user specifications can be captured in dropdown boxes, selection boxes, radio buttons, or freeform input boxes within the nodes visually depicted on the system builder GUI 208. Because the functions 150 represent user-friendly drag and drop code blocks, each function 150 may comprise certain limitations about the format of input it may receive and the format of output it may output, just as a regular function of computer code. For example, a "Split Message" function may receive a message as input (e.g., text) as well as a designated delimiter (e.g., a comma, dash, etc.) and output a delimited message (e.g., text). In this example, if a user tried to feed an image as input into the "Split Message" function, the AVD system 120 may generate an error or otherwise alert the user that "Message" is the required input format rather than "Image." Thus in some embodiments, the functions 150 may be considered a "strongly typed" programming language.

In some embodiments, the system builder GUI and/or the graph viewer 206 may include a variety of node types. For example, node types may include content nodes, entity nodes, event nodes, data nodes, model nodes, interaction nodes, location nodes, transaction nodes, rule nodes, resource nodes, process nodes, feedback nodes, filter nodes, and goal nodes. Each example node type will be discussed in turn below.

A content node may represent any form of content, including text, images, audio, and video. This node type may be applied in use cases such as entertainment, digital media, and education, thus enabling the management of various content forms within generative models.

An entity node may define objects or entities within specific domains/industries. For example, an entity node may represent a building in urban development, a vehicle in transportation management, or a devices in Internet of Things (IoT) applications. An entity node allows for modeling real-world objects and their interactions within a given domain/industry.

An event node may capture events or actions. For example, an event node could be used in scenarios of traffic management, public safety services, and predictive maintenance. Event nodes may track and respond to actions within a system being modeled (e.g., traffic management system), facilitating dynamic and responsive models.

A data node may hold raw or processed data to serve as the basis for analytics, research, and optimization tasks across sectors such as health and wellness, financial services, and environmental tech. This node type enables data-driven decision-making and analysis within the AVD system 120.

A model node may encapsulate generative models. In some embodiments model nodes encapsulate simulations, which may be used for areas such as medical research, space exploration, and smart manufacturing. Model nodes allow the integration and utilization of complex generative models within the AVD system 120.

An interaction node may describe interactions between users and systems or between different entities. An interaction node may be used for social impact platforms, collaborative learning, and entertainment personalization, thus modeling complex interaction dynamics.

A location node may specify geographical locations or spatial data. For example, a location node may be used in the context of smart cities, urban infrastructure optimization, precision agriculture, or any application requiring spatial awareness and geographical context.

A transaction node may detail financial transactions or exchanges, crucial for fintech innovations, supply chain resilience, risk management, or for modeling financial interactions and ensuring transactional accuracy within the AVD system 120.

A rule node may define rules, regulations, or guidelines, applicable in cybersecurity, public engagement platforms, and ethical AI governance. Rule nodes may establish constraints and guide behaviors within the AVD system 120.

A resource node may identify resources or assets, such as renewable energy sources, educational materials, or digital art assets. Resource nodes may manage and optimize the use of various resources within generative models.

A process node outlines processes or workflows for areas such as Augmented Reality (AR) development, robot programming, and product design. Process nodes may model complex workflows and operational sequences within the AVD system 120.

A feedback node may capture user feedback, suggestions, or evaluations, important for adaptive gaming experiences, disaster response management, and privacy-enhancing technologies. Feedback nodes may be used for iterative improvement and user-driven model refinement.

A filter node may provide for filtering of messages from upstream nodes. Filters may be applied to selectively include or exclude content from passing to downstream nodes based on, for example, the presence of text, presence of images, or presence of tables. In some embodiments, multiple filters can exist on a single node, and content or other data must pass all filters to be passed through to downstream nodes. Content or other data that passes the filter criteria is passed through unchanged. In some embodiments, the filter may be a dual-output filter. For example, data that does not pass the filter can be redirected to a different output port, facilitating different processing on that data than on the data that passed the filters.

Goal nodes may represent objectives or goals within systems or applications, aligning with commander's intent principles, strategy formulation, and achievement systems in gamification. Goal nodes may be used to direct the overall purpose and outcome of generative models within the AVD system 120.

In some embodiments, the AVD system 120 supports node-level freezing of intermediate outputs, also referred to herein as "pinning," such that a user may freeze a flow 292 at a specific node or set of nodes rather than only at whole-workflow version boundaries. For example, via an interactive control (e.g., a menu control) associated with a display object for any node that produces output, the user may select an option to "pin output" for a selected node. In response the AVD system 120 may store, with the flow 292, pinned state data for the selected function or other node, including an identifier of the function or other node, an identifier of the version state from which the pin was created, and serialized data representing the output of the function or other node (and, in some embodiments, one or more internal parameters or intermediate state values reached during execution of the flow). After pinning, the pinned node may be treated as providing a fixed output for subsequent execution such that the pinned node and one or more upstream functions that supply inputs to the pinned node are deactivated for re-execution and the flow 292 proceeds using the stored pinned output as input to one or more downstream nodes. From such a pinned state, the user may branch the flow 292 by editing one or more downstream nodes, parameters, model selections, or other aspects, and executing the branched flow to generate new samples of content while retaining the pinned output as a preserved intermediate result, thereby enabling iterative exploration of downstream nondeterministic outcomes without redoing upstream processing. Pinning functionality may be applied to any node having an output data type, including nodes that produce nondeterministic content generated by a generative artificial intelligence model (e.g., LLM outputs, images, scripts, or other content), and the graph-based representation stored in the graph data store 242 may include metadata indicating that a node is pinned, a reference to stored pinned output data, and dependency information indicating which upstream portions of the flow are bypassed during execution due to the pin. Pinning may be especially powerful when revisiting versions and iterations of a flow, allowing for partial re-execution of partition of a flow 292 based on—or without affecting—nondeterministic output previously produced by a pinned function.

A visual indicator may be displayed on or near the pinned node (e.g., a "pin" icon) to indicate the node is currently pinned. Using an interactive control associated with the display object (e.g., the menu control used to initiate pinning for the node), the user may select an option to "unpin output" for a selected node, and in response the AVD system 120 may clear out any state data stored with the flow 292 for the selected node. In response, the pinned node and any upstream nodes that supply inputs to the pinned node are activated for execution during subsequent executions of the flow 292.

In some embodiments, the data storage 140 of the AVD system 120 may include storage for functionality of the AVD system 120, such as a graph data store 242, a system history data store 244, a user profile data store 246, and a function data store 248. Illustratively, a graph data store 242 may store graph data and other metadata involved in the processes of the graph generator 180 (e.g., graphs displayed by the graph viewer 206). A system history data store 244 may serve as storage for any number of past user sessions of the AVD system 120, including iteration histories of various graphical representations 294 of flows 292 (and their corresponding samples of content 296 generated by each iteration of each flow 292) contained in output 190 (e.g., a flow generated by the AVD system 120). Because the output 190 of the AVD system 120 is flexible and nondeterministic, users may edit the output 190 by modifying any portion of the process built in the system builder GUI 208 with functions 150. For this reason, storing an iteration history of the various iterations of a flow 292 generated by the AVD system 120 in the system history data store 244 provides valuable context that allows a user of the AVD system 120 to make nimble, agile changes in real time according to their ever-changing creative needs or requirements.

The data storage 140 may also illustratively include a user profile data store 246 serving as storage for instructions of user functions 152 and the various context data (e.g., threads, past output 190, prompts, user preferences, etc.) used by those user functions 152 in order to provide customized user experiences for a given user of the AVD system 120. More broadly, the data storage 140 may include a function data store 248 storing the instructions related to the various pre-programmed functions 150 available as building blocks for a user of the AVD system 120.

In some embodiments, the AVD system 120 may include AI tools 170 such as generative AI media tools 272, LLMs 274, and computer vision tools 276. Illustratively, the generative AI media tools 272 may be any trained machine learning model (e.g., a sequence-to-sequence model, also referred to as "Seq2Seq" model) that utilizes deep learning algorithms to process and understand natural language queries or prompts and generates outputs (e.g., text, images, audio, video, etc.). The generative AI media tools 272 may be trained on a large corpus of data. Moreover, the generative AI media tools 272 may be a transformer-based network or other self-attention-based network (e.g., an encoder-decoder transformer architecture or decoder-only transformer architecture). Additionally, the generative AI media tools 272 may process or compute an assortment of language tasks, such as translating languages, analyzing properties of an API response, chatbot conversations, and more. The generative AI media tools 272 may process or compute conversational textual data, identify one or more entities and relationships between them, and generate new text that is coherent and grammatically accurate. In some embodiments, a generative AI media tool 272 may be a multimodal LLM. In some embodiments, a generative AI media tool 272 may be any foundation model provided to the AVD system 120 (e.g., text to text, text plus video to text, or any multimodal combination that may be advantageous). The AVD system 120 may have access to any number of LLMs 274 and computer vision tools 276. For example, the AVD system 120 may use computer vision tools 276 to execute tasks related to understanding the context of visual media such as images or video. Advantageously, the suite of AI tools 170 may be vast and continually updated according to needs of the AVD system 120 and latest technological developments.

In some embodiments, upon the iterative implementation of various functions 150 into a specified flow on the system builder GUI 208, the user of the AVD system 120 may decide to finalize output 190 for use in the creative process. More specifically, output 190 of the AVD system 120 may include a flow 292 (e.g., a flow, application, computer program) displayed on the system builder GUI 208, its corresponding graphical representation 294 displayed on the graph viewer 206, and content 296 generated by a given iteration of a flow 292. Each output 190 (including each of its various iterations, versions, etc.) may be stored for later reference by the user in the system history data store 244. Upon generation of output 190, a user of the AVD system 120 may desire to execute the flow 292 that was created. For example, the screenplay imagery generation example that will be discussed below in connection with FIG. 2B may be part of the output 190 of the AVD system 120. Moreover, a user may execute the screenplay imagery generation tool (e.g., a flow 292) that they built with the AVD system 120 any number of times to generate various samples of content 296 (e.g., nondeterministic samples of a screenplay).

Example Operation of AVD System

FIG. 2B is a flow diagram of a routine 201 for generating AI-based applications, such as complex workflow tasks. Woven throughout the discussion of FIG. 2B, an illustrative practical example of a creative workflow task that might be generated by the AVD system 120 is discussed. Namely, an example generating a flow for the creation of a storyboard (e.g., a collection of images depicting a movie's story scene by scene) from the text input of a movie screenplay will follow the numbered blocks of the routine. This example is illustrative in nature and represents just one embodiment of an AVD system 120 for the purposes of discussion.

Routine 201 may begin at block 221, in which the AVD system 120 implements a first function in a new flow for creative tasks according to user input 110. More specifically, at block 221, the AVD system may receive input 110 from a user device 102 into the user interface 105 (e.g., input as text/selections at the system builder GUI 208). In some embodiments, the input 110 may include a selected function 150 from among the available functions 150 to serve as the first function. The input 110 may also, in some embodiments, include creative direction 212.

For example, assume throughout the example in the present discussion of FIG. 2B that the user of the AVD system 120 is a screenwriter in the film industry with no previous experience writing code. In the example, the screenwriter has the text of a new screenplay, and in order to pitch the screenplay to the wider team of writers, the user wants to create a flow that automatically produces a storyboard from the text of the screenplay (hereafter, this will be referred to as the "storyboard workflow" throughout discussion of this example). More specifically, the storyboard workflow will generate a representative image for each scene from the screenplay and output the ordered set of images as a storyboard.

Thus, at block 221 of routine 201, this storyboard workflow example begins when the screenwriter chooses the first function for their storyboard workflow from among the available functions 150 of the AVD system 120. In some embodiments, the screenwriter may view a "drag and drop" or wireframe screen on the system builder GUI 208. Such a view may provide a high-level, abstracted list of functions 150 with plain language names and corresponding descriptions of functionality, inputs, and outputs for each function 150. Illustratively, the screenwriter may choose a function 150 called "Load Message" as the first function for the storyboard workflow. The "Load Message" function may receive text (e.g., a text file containing the screenplay) as input and output the screenplay text in a machine-readable format for use as input to the next function in the storyboard workflow. Notably, in the present example, the illustrative "Load Message" function is used to upload a screenplay. However, the "Load Message" function serves as a flexible building block for different kinds of flows for creative tasks, allowing users to upload any relevant text or file for the objective at hand. More broadly, any pre-programmed function 150 may comprise logic applicable in different contexts for different tasks: functions 150 serve as versatile tools in a visual programming toolbox.

Routine 201 continues at block 222, in which the AVD system 120 receives user input directed to user specifications and desired edits to the first function implemented in block 221. More specifically, the system builder GUI 208 may provide various dropdown options, selections, radio buttons, and freeform input boxes in connection with its visualization of the first function and its visual representation on the screen. These options serve as interactive GUI components for a user to customize the implementation of their chosen function according to the needs of their overall objective. In this way, the functions 150 and their visual depiction on the system builder GUI 208 provide a flexible, dynamic, customizable, and user-friendly set of options for each function without requiring the user to actually write computer code in order to implement such customizations.

For example, in the storyboard workflow example at block 222, the "Load Message" function may include a "Choose file" button on the system builder GUI 208 allowing the screenwriter to upload the screenplay file from the desktop of their user computing device 102. Further, the screenwriter could customize the "Load Message" function by specifying a specific file type they want to receive in the workflow for the screenplay file format (e.g., .txt file, .doc file). While the "Load Message" function is relatively simple, as functions 150 become more complex, the system builder GUI 208 may provide more complex options for the screenwriter to apply user specifications and desired edits (e.g., customizations) to the chosen function. In this way, the customizations (e.g., user customizations and desired edits) available through the system builder GUI 208 may represent creative direction 212 received as part of the overall input 110 from the user. In this way, the options available for the user to apply creative direction 212 to a given function 150 in the system builder GUI 208 are another aspect of the overall dynamic, flexible, customizable nature of the AVD system 120.

Next at block 223 of routine 201, a user may add a second function to the workflow. More specifically, a user may choose a second function from among the functions 150 of the AVD system 120 displayed on the system builder GUI 208 to serve as the second building block in the process of the desired flow. Because this second function is a high-level abstraction representing computer code for a desired subtask, it may comprise certain limitations. Namely, if the second function is implemented in a sequence following the first function of block 221, then the second function may receive the output from the first function as its own input.

For example, assume the screenwriter in the storyboard workflow example chooses at block 223 to implement a backend service function 254 called "Split Document" as the second function. In such an example, the screenwriter could chain together (e.g., visually on the system builder GUI 208) the first "Load Message" function and the second "Split Document" function on the system builder GUI 208 in such a way that the output of the "Load Message" function is input to the "Split Document" function. More specifically, the "Load Message" function may illustratively output a machine-readable format of a screenplay document that is then supplied to the "Split Document" function as input. In turn, the "Split Document" function may comprise functionality (e.g., layered logic and abstracted code) that leverages AI tools 170 to break the document (e.g., the screenplay) into chunks (e.g., logical chunks representative of individual scenes within the screenplay). In this way, the output of the "Split Document" function may illustratively be a list of scenes, with each scene being captured in a "chunk" of machine-readable text sourced from the screenplay. For example, the "Split Document" function may split text at one or more delimiting characters. As another example, the "Split Document" function may use an agent or other component that inputs a message into an LLM (or other AI component) and requests that the message be split. Guidelines for splitting may be provided (e.g., based on the nature of the message, as input from the user, etc.), or the agent may determine how to split the message.

Exemplary routine 201 may continue at block 224, in which the AVD system 120 optionally receives further user input 110 to further tailor, customize, or otherwise edit the first or second function implemented so far in the workflow on the system builder GUI 208. Namely, the AVD system 120 may apply user specifications and desired edits to the first and/or second function according to the actions taken by the user (e.g., through dropdown boxes, selection boxes, radio buttons, or freeform input boxes within the nodes visually depicted on the system builder GUI 208 for the first and second function).

In the storyboarding workflow example, block 224 may include verbal instructions from the screenwriter or visual manipulations on the system builder GUI 208 to customize the first or second function. For example, the screenwriter may instruct the AVD system 120 to output 200 word summaries (e.g., in text format) of each scene from the "Split Document" function rather than the full text of each scene in its entirety. Any number of customizations to either of the functions implemented in the workflow so far may occur at block 224 in order to customize the workflow to the screenwriter's needs and preferences for the particular objective.

Next, routine 201 proceeds to decision block 225. At block 225, the routine splits into two paths. If the user has another function to add to the workflow before completing the workflow, the routine proceeds to block 226. However, if the workflow is complete and no further functions 150 are to be added to the present workflow, the routine may proceed to the final block 228 at which the generated workflow is output for use in creative processes.

When another function is to be added to the workflow at decision block 225, the routine proceeds to block 226. At block 226, an Nth function is added to the workflow. The Nth function optionally receives input from the output of one or more previous functions preceding it (e.g., the [N−1]th function). Namely, as will be discussed in more detail below, the routine may proceed iteratively from decision block 225 to block 226 for each additional function that is added to the workflow until the workflow is complete. In some embodiments, the AVD system 120 supports the development of complex, interconnected workflows that "branch" into different logical branches according to the state of the workflow in any particular instantiation. In this way, non-technical users may develop complex flows and computer applications with many interconnected logical dependencies without ever writing actual computer code and instead building a web of connected functions visually in the system builder GUI 208.

In the storyboarding workflow example, at decision block 225, the screenwriter would indicate that they have more functions to add to the storyboarding workflow, and thus would proceed to block 226. At block 226, the screenwriter would add the Nth function (e.g., the third function, because in this case "N" is equal to 3) to the workflow, configuring the output of the (N−1)th function (e.g., the second function, because in this case "N−1" is equal to 2) to be the input to the third function. For example, the screenwriter may decide to implement a third function on the system builder GUI 208 from among the available backend service functions 254 illustratively called "Get Characters" that receives input from the output of the previous second function, "Split Document," and subsequently lists the characters from each scene in the screenplay along with text descriptions of each character. Illustratively, the "Get Characters" function may output text lists of the names of each character within each scene in the screenplay, along with visual descriptions of the characters and their features. In one example, the "Get Characters" function may use an agent or other component that inputs text (or other content) into an LLM (or other AI component) and requests that one or more characters be identified. The LLM may then process the input and produce output listing one or more characters in the input. Guidelines for identifying characters may be provided (e.g., as a pre-configured prompt to which the text input is added), or the agent may determine how to identify characters.

Next, routine 201 proceeds to block 227, in which the AVD system 120 applies user specifications and desired edits to any of the functions added to the system builder GUI 208 thus far (e.g., just as in blocks 222 and 224 previously). For example, in the storyboarding workflow example, the screenwriter may determine that the second function (e.g., "Split Document") is currently configured within the system GUI 208 to output textual summaries of each scene rather than the full scene itself. The screenwriter may determine that this particular configuration is not ideal for their storyboarding workflow, because the textual summaries of scenes are being input into the third function (e.g., "Get Characters"), rather than the text of the entire scene. For this reason, the screenwriter may determine that the output of the "Get Characters" function (e.g., a list of characters and their descriptions) is being limited by the fact that only minimal character information is being conveyed in the summaries being output by the "Split Document" function. However, the AVD system 120 is designed with large amounts of flexibility for configuration of input and output. The screenwriter may use the system builder GUI to edit the output of the "Split Document" function to be the full text of each scene. Thus, in this example at block 227, the screenwriter may use a dropdown option to change output format for the second function in the system builder GUI 208 to make an edit that makes the overall flow more accurate and curated to the particular objective at hand. Notably, the screenwriter can make this change to the workflow without changing anything already configured about the third function; instead, upon changing the output of the second function, the AVD system 120 will automatically update the overall workflow to receive full text at the "Get Characters" function, resulting in a new version (e.g., "Version 2") of the original workflow (e.g., if "Version 1" is considered the version before the change at block 227). In the new version, a more detailed character list will be output. Notably, in some embodiments, both Version 1 and Version 2 may be saved to the system history data store 244 (e.g., as a history graph for the workflow), and although the screenwriter may prefer Version 2, if the screenwriter were ever to change their mind and decide Version 1 is a more preferable version of the workflow for another task, it would be easily retrievable and executable as desired. In some embodiments, the system builder GUI 208 may display a visual pane that lists all versions of any given workflow in a "Version History" visual display pane for easy access for the user. Examples history graphs are described in greater detail herein and shown in FIGS. 5A and 5B.

After block 227, routine 201 proceeds iteratively back to decision block 225, at which point the routine splits into two paths again. If the user has another function to add to the workflow before completing the workflow, the routine proceeds to block 226. However, if the workflow is complete and no further functions 150 are to be added to the present workflow, the routine may proceed to the final block 228 at which the generated workflow is output for use in creative processes.

Turning back to the storyboarding example once more, assume the screenwriter has another function to add to the workflow at the return to decision block 225. Thus, the routine proceeds once again to block 226: an Nth function (e.g., the fourth function, because in this case "N" is equal to 4) is added to the workflow, configuring the output of the (N−1)th function (e.g., the third function, because in this case "N−1" is equal to 3) to be the input to the fourth function. For example, the screenwriter at block 226 may decide to add a "Build Thread" function to the workflow to serve as the fourth function. The "Build Thread" function may take as input the list of characters and their descriptions from the output of the third function, "Get Characters." The routine may proceed iteratively in this example any number of times once again to block 227 for edits, and then back to decision block 225 for the addition of more functions.

Assume for the sake of the example that this cycle repeats several more times in the storyboarding example as the following functions are added to the storyboarding workflow: the screenwriter builds a new branch in which the first function feeds to a new logical branch with another instantiation of the "Split Document" function that outputs the entire text of each scene from the screenplay. The routine repeats again, and a "Get Scene Description" is appended to the second "Split Document" function, receiving as input the entire text of every scene, and outputting visual descriptions of each scene. The routine repeats again, and now the second logical branch reconnects with the first original logical branch by inputting the "Get Scene Description" output into the original fourth function, "Build Thread." Thus, now the fourth function, "Build Thread" is receiving input from two sources: the "Get Characters" function and the "Get Scene Description" function. The "Build Thread" function is now able to build a text thread that has an ordered list of characters and scene descriptions for each scene, and accordingly this list is output from "Build Thread" and provided to a new function called "Send to LLM" in the next iteration of the routine. Thus, the characters and scene descriptions may be iteratively fed into an LLM amidst prompt formatting configured by the screenwriter in the system builder GUI 208 for the "Send to LLM" function. The "Send to LLM" function may call the LLM with a prompt provided by the screenwriter in a textbox corresponding to the "Send to LLM" function in the system builder GUI 208: "You are a photographer whose art is composing an image that encapsulates a dramatic scene from a screenplay. Given the scene description and list of characters, write a short, detailed description of the image, including detailed visual information. Include style guidelines."

Accordingly, the "Send to LLM" function may output the response from the LLM, namely, a short detailed natural language description of "images" for each scene, along with style guidelines. Thus, the screenwriter could continue building the flow by returning to decision block 225 once again to add yet another function: "Generate Image." The "Generate Image" function may receive input from the "Send to LLM" function and may use the natural language descriptions of an image for each scene to actually generate images for each scene and output a list of images. The "Generate Image" function may in some embodiments use image generation tools or services external to the AVD system 120. In some embodiments, the screenwriter may decide to manually configure (e.g., at block 227) which AI tool 170 they would prefer the flow to use for the "Generate Image" step, such as tools integrated into the AVD system 120 or image generation tools or services external to the AVD system 120. The screenwriter may experiment with many versions of the flow before finally landing on a finalized flow that generates imagery they believe accurately represents their screenplay. Upon finally reaching this point, the routine proceeds to block 228.

At block 228, the routine concludes when a finalized generated workflow for use in a creative process is output by the AVD system 120. In the storyboarding example, the output 190 that is provided by the AVD system 120 may be a flow 292 (e.g., a workflow for generating a storyboard set of images from an input of a screenplay) along with a graph of the system (e.g., a history graph from the graph data store 242 generated by the graph generator 180) visually representing the workflow generated by the screenwriter. Thus at block 228, the screenwriter may begin using the storyboarding tool they built with the AVD system 120 to generate storyboards in their creative iteration process in the film industry with their teams of writers and directors.

In some embodiments, the flow 292 may be executed in a "dry run" or test mode (e.g., by selecting a user interface control or activating an option for the dry run mode). In this mode, the AVD system 120 validates and executes the flow 292 without making actual LLM calls or other API calls, and thereby the dry run does not consume the same level of computing resources or incur the same level of costs associated with normal execution of the flow 292. The dry run thus allows for testing of flow configuration and connection validity. In some embodiments, the dry run executes the flow 292 with placeholders (e.g., cached, static, or synthetic data) for LLM calls or other API calls. In such embodiments, the dry run of the flow 292 may produce output with the benefit of not consuming computing resources or otherwise incurring costs associated with a full execution that includes live LLM calls or other API calls.

FIG. 3A is a depiction of an illustrative user interface 301 displaying an interactive graph-based representation of a creative workflow generated using the AVD system 120. The example user interface 301, which may be generated and managed using system GUI builder 208, illustrates the concepts described with respect to FIG. 2B (and elsewhere herein) in the context of a workflow that generates content using different types of functions, including system-provided functions 150 (also referred to herein as primitive functions 150) and user functions 152. Each of the functions is represented by display object with which a user of the AVD system 120 may interact. For example, a user may add, move, edit, connect, delete, or otherwise interact with display objects representing functions 150 and user functions 152. Advantageously, GUI builder 208 can enforce strongly typed development through the use of connections between functions that are type aware. For example, the GUI builder 208 can prevent a user from connecting the output of one function to the input of another function unless the data types of the output and input are compatible. Such graphical enforcement of strongly typed development can reduce the occurrence of frustrating run time errors that non-technical users may have difficulty in debugging. In addition, the interface generated by the GUI builder 208 can provide for interactive execution of workflows from within the development interface itself, allowing users to immediately test their workflows, modify the workflows based on the tests, and re-test the modifications without leaving the interface.

The illustrative workflow includes functions 310, 320, 330, 340, and 350 arranged to execute such that the operation of some functions depends on the output or other processing performed by other functions. For example, the first system-provided function 150 in the workflow, function 310, is a write message function that generates message output based on input and one or more parameters. One parameter 311 indicates the source of the input, which may be input from a file, input generated as output of another function, user-provided input, or the like. In the illustrated example, the input source parameter 311 has been set to "user," indicating that the input for the function is to be entered interactively by a user (e.g., within the development interface itself). In addition, the display object for function 310 includes an interactive entry area 312 into which a user may provide input for function 310. In this example, the user is providing a topic for haikus to be generated ("the decline of traditional societal values due to the overabundance of bananas"). Function 310 produces output 313 of a "message" data type, which corresponds to a text string in this example. The output 313 has been connected to the input 321 of another function—function 320—using a display object for the connection 314. Input 321 is a "topic" data type, which corresponds to a text string in this example. Therefore, the interface permits connection 314 to be established between output 313 and input 321. If input 321 was a data type that is incompatible with string input, such as an image input or an audio input, the interface may not permit connection 314 to be established, thereby reducing the possibility of run time errors.

Function 320 is a user function 152 for writing haikus. When there is an operation that will be reused across multiple workflows and the AVD system 120 does not provide a primitive function 150 for the operation, users may define user functions 152. As discussed herein, user functions 152 may be composed of any number of primitive functions 150 arranged to execute in a manner that produces a particular result or set of results that is not available through any single primitive function 150 alone. FIG. 3B illustrates an example interface 302 with primitive functions 150 arranged to provide the functionality of the write haiku function 320. In this example, function 320 includes operations to instruct an LLM to generate haikus according to particular inputs and parameters. As shown, there is an input function 350 that obtains input to function 320 and provides the input to a template builder function 360. Template builder function 360 has a predefined textual template 362 ("write a haiku about {topic}") into which it will insert the input, received from input function 350, at the proper location (e.g., between the brackets "{ }"). The input will be provided to a build thread function 370, which builds a thread for prompting an LLM executed by the send-to-LLM function 380. The send-to-LLM function 380 has various parameters, including a choice of LLM parameter 382 for selecting a particular LLM to which the prompt is to be sent, and a temperature parameter 384 to control a degree of nondeterminism in LLM execution (e.g., how creative the LLM is to be). Output produced by the LLM is then provided to the output function 390, which provides the output of the overall haiku function 320 to the next function in the workflow illustrated in FIG. 3A.

Returning to FIG. 3A, write haiku function 320 produces output 322 of a "thread" data type, which corresponds to a text string for output from an LLM in this example (e.g., the LLM that is the subject of the send-to-LLM function illustrated in FIG. 3B). The output 322 has been connected to the input 341 of another function—function 340—using a display object for the connection 323. Input 341 is also a "thread" data type, and therefore, the interface permits connection 323 to be established between output 322 and input 341.

Function 330 is a write message function that generates message output based on input and one or more parameters. One parameter 332 indicates the source of the input, which may be input from a file, input generated as output of another function, user-provided input, or the like. In the illustrated example, the input source parameter 332 has been set to "user," indicating that the input for the function is to be entered interactively by a user (e.g., within the development interface itself). In addition, the display object for function 330 includes an interactive entry area 333 into which a user may provide input for function 330. In this example, the user provides a tone for the haikus to be generated ("whimsical"). Function 330 produces output 334 of a "message" data type, which corresponds to a text string in this example. The output 334 has been connected to the input 342 of another function—function 340—using a display object for the connection 335. Input 342 is a "tone" data type, which corresponds to a text string in this example. Therefore, the interface permits connection 335 to be established between output 334 and input 342.

Function 340 is another user function 152: a tonal changer function that modifies the tone of one input 341 based on a tone indicated in another input 342. The specific functions and operations of the tonal changer function 340 are abstracted into a single function similar to the haiku writing function 320 shown in FIG. 3B. For ease of description, the specific internal functions and operations of the tonal changer function 340 down to the primitive functions 150 of the AVD system 120 are not shown. In this example, input 341 is a thread of LLM output (e.g., a haiku) generated by the haiku function 320, and input 342 is a tone provided by function 330. The tonal changer may prompt an LLM to rewrite the thread input 341 according to the tone indicated in the tone input. The resulting thread output with changed tone may be provided to an output function 350, which processes the thread into a form that can be presented as a message or provided to other functions, workflows, or the like.

Figure 4:
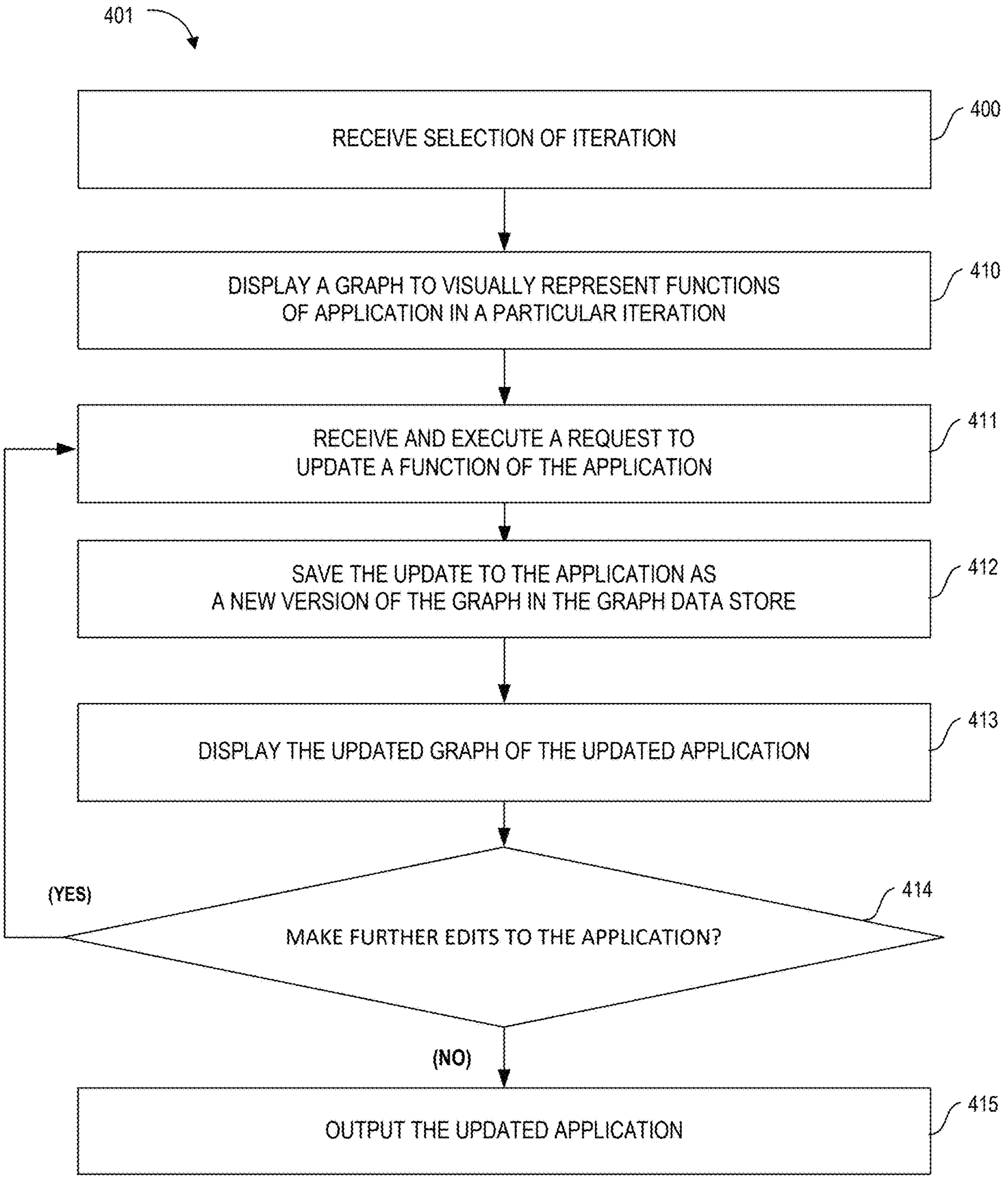
FIG. 4 is a flow diagram of a routine detailing the illustrative interactions for updating artificial intelligence-based workflows or other applications using graph data, in accordance with aspects of the present application.
Figure 5A:
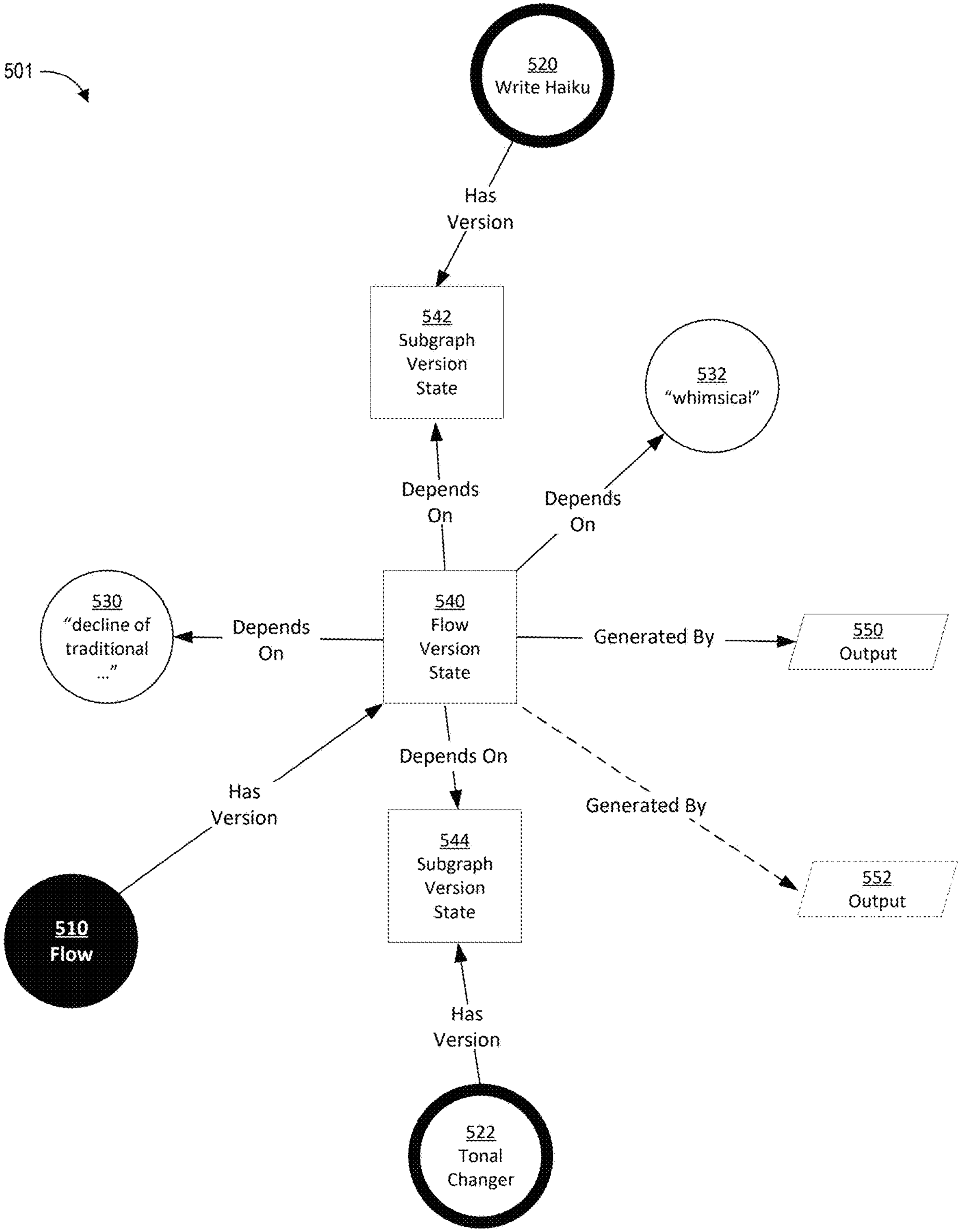
FIG. 5A is a depiction of an illustrative user interface displaying a history graph representing the version and iteration history of an application generated by an AVD system, in accordance with aspects of the present application.
Figure 5B:
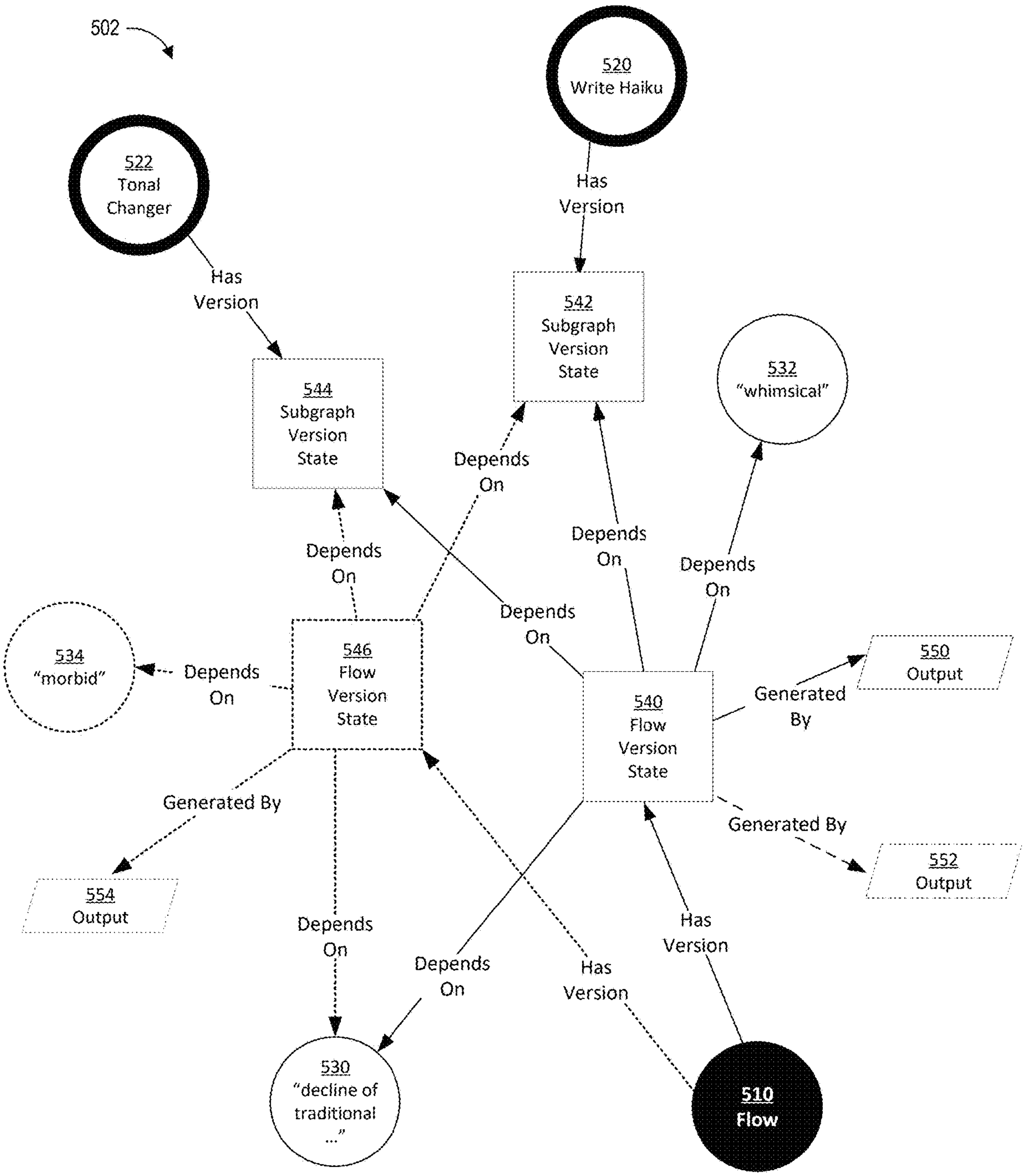
FIG. 5B is a depiction of an illustrative user interface displaying a history graph representing a change to the application associated with the history graph of FIG. 5A, in accordance with aspects of the present application.

FIG. 4 is a flow diagram of a routine 401 for modifying and iterating on workflows or other applications. For purposes of discussion, the workflow example from FIGS. 3A and 3B will be referenced. Illustrative history graphs of the workflow system and changes thereto are shown in FIGS. 5A and 5B and will also be referenced. Although FIG. 4 will be described with respect to history graphs (e.g., graph-based data structures and/or visualizations), the description is provided for purposes of illustration only and is not intended to be limiting, required, or exhaustive. In some embodiments, history of a workflow may be presented using other visualizations, such as lists. In some embodiments, history of a workflow may be stored using other data structures, such as arrays, tables, or the like.

Routine 401 begins at block 400. A user may access a listing of applications (flows 292), versions of flows, iterations of flows, etc. In some embodiments, versions and/or iterations may be tagged (e.g., by users interactively applying labels or metadata) to support filtering and retrieval. In such cases, a user may search or filter the versions and/or iterations in order to select one to view, modify, or run.

At block 410, the AVD system 120 displays, on the graph viewer 206, a graphical representation 294 that has been generated by the graph generator 180 to visually represent the history of an application (e.g., a flow 292). More specifically, the graphical representation 294 may visually represent a particular version (or multiple versions) of a flow 292 and content 296 from a particular iteration (or multiple iterations) executed by a particular version of a flow 292 generated by the AVD system 120.

In addition to (or instead of) the graphical representation of the workflow, a graphical representation of the history graph of the workflow may be shown. FIG. 5A shows a graphical representation 501 of the history graph of the haiku workflow from FIG. 3A. The graphical representation 501 includes nodes and edges, where the nodes represent the workflow, user functions, version states, inputs, and outputs. The edges of the graphical representation 501 represent relationships between the objects represented by the nodes, including "generated by," "depends on," and "has version."

In some embodiments, a number of different edges are available to users of the AVD system 120. For example, edges of an AVD system 120 may include dependency edges, hierarchical relationships, data flow paths, interaction links, temporal sequences, spatial connections, causal links, ownership or association ties, reference or citation links, resource allocation edges, condition or rule-based edges, collaboration or partnership links, feedback and evaluation connections, compatibility or suitability links, and inheritance or trait transmission paths.

In some embodiments, each node and edge may possess associated properties or attributes, thus providing additional detail and context. Such properties/attributes may illustratively include standard properties, domain-specific attributes, behavioral metrics, quantitative measures, qualitative descriptions, relational attributes, geospatial properties, temporal dynamics, security and privacy labels, customizable user tags, performance metrics, compliance markers, interaction details, and resource specifications.

The flow node 510 is the entry point to the history graph 501 and may indicate that the workflow has any number of versions. In the illustrated example, the flow node 510 has a single "has version" relationship with a single flow version state 540. The flow version state 540 defines, for a single version of the workflow, the specific functions that are included, the order in which they execute, the data the functions pass to each other, and the like. User defined functions included in a version of the workflow may each have their own versions maintained by subgraph version states. For example, because the haiku generator workflow uses a write haiku function 320 and a tonal changer function 340, these user functions are represented by user function nodes 520 and 522, respectively. User function nodes 520 and 522 each have a 'has version" relationships with a subgraph version state—subgraph version state 542 and subgraph version state 544, respectively—in the history graph 501 to define the specific functions included in the user functions, the order in which they execute, the data the functions pass to each other, and the like.

The history graph 501 also includes an input node for each element of input into the workflow. The haiku generator workflow receives, as input, a topic for haikus to be generated ("the decline of traditional societal values due to the overabundance of bananas" in this example) and a tone for the tonal changer ("whimsical" in this example). These elements of input are represented by input nodes 530 and 532, respectively. The flow version state 540 has a "depends on" relationship with each of the input nodes 530 and 532. In addition to user function nodes, version state nodes, and input nodes, the history graph 501 includes nodes for the output generated during each execution (also referred to as an iteration) of the workflow that the history graph 501 represents. In the illustrated example, a single iteration of the workflow was executed, and the output is represented by output node 550.

The workflow history graph 501 accordingly includes all information needed by the AVD system 120 to revisit workflows at a later time for additional iterations (e.g., to generate new output that is distinct from the prior output, even if the same input is used, due to the nondeterministic nature of certain functions used in the workflow). The output from each of these iterations may be added to the history graph. For example, output node 552, which corresponds to the output of a different iteration of the same version of the workflow, is added to the history graph 501 (shown in dashed line to indicate addition to the history graph 501 after the original creation of the history graph 501).

Returning to routine 401, execution continues at block 411 in which the AVD system 120 receives and executes a request (e.g., in the form of user input 110) to update a function of the flow 292 or other application. As a user views a graphical representation 294 of a flow 292 generated by the AVD system 120 and/or a history graph for the workflow, the visualization may prompt ideas for ways to edit or change the workflow.

For example, the user may view the graphical representation 294 of the haiku generation workflow and determine that they would like to try a different input item to produce a haiku that is different in subject or tone from the haiku(s) generated using the first version of the workflow. The user may change the input to the tonal changer function, such as by specifying that the tone is to be "morbid" instead of the prior "whimsical" tone. Changing the input triggers a new version of the workflow, because one or more functions will be working on different input, rather than generating different nondeterministic output for the same input.

At block 412, routine 401 continues as the AVD system 120 applies the update to the workflow and adds as a new version of the workflow in the history graph, which is stored in the graph data store 242. Upon saving the updated history graph, the routine 401 proceeds to block 413 at which point the updated history graph is displayed by the AVD system 120 on the graph viewer 206. For example, at block 413 the user would see a new graphical representation 294 with an additional node and relationship representing the new input and the new version.

FIG. 5B shows a modified history graph 502 that reflects the addition of a new version of the workflow to account for the changed input. The nodes and edges that have been added to account for the changed input are indicated in dotted lines for ease of identification. As shown, a second flow version state 546 has been added to the history graph 502 to account for the addition of input node 534, representing the modified input (to "morbid" from "whimsical"). Additional "depends on" relationships are added to the second flow version state 546 so that the second flow version state 546 is associated with each other node and element needed to execute the flow version. Once the second flow version is executed, a new output node 554 is added in a "generated by" relationship with the second flow version state 546. Although not shown, each subsequent iteration of the second version of the flow will result in addition of another output node with a "generated by" relationship with the second flow version state 546.

As shown, history graph 502 accounts for both the original version of the flow and the new version of the flow, and all outputs generated from each iteration of each version. Although the illustration is provided in the form of a graph, other representations may be used without departing from the underlying versioning and iteration recording functionality. For example, a series of records in a relational database table or set of tables may be used to store the version and iteration history of a workflow. Advantageously, the data representing the version and iteration history of a workflow—whether in graph form or another form—allows users to revisit any prior version of a workflow, and any result of any prior iteration of a workflow. The user may revisit the historical version and iterations to modify them and create new versions, to further iterate prior versions, and the like. Moreover, because an entire execution graph may be encapsulated in a single user function, an entire prior version or iteration of a workflow may be leveraged as merely one piece of a larger workflow, allowing for multiple levels of versioning and iteration. Such hierarchical versioning allows for greater control, customization, and reusability of workflows and other applications.

Returning to FIG. 4, at decision block 414, routine 401 continues and splits into two paths: one path that allows the user to continue to make edits to the graphical representation 294, and another path in which the updates are complete. When there are further edits to be made to the computing system (e.g., the flow 292), the routine loops back and repeats blocks 411-413. For example, the user could continue to make edits to the graph if they wanted to apply further changes to the haiku generation flow. Routine 401 may repeat as many times as desired until the user determines at block 414 that the edits they would like to make are complete, at which point the routine 401 proceeds to the final block 415. At block 415, the AVD system 120 may output the updated flow (e.g., the flow 292 and its graphical representation 294).

Figure 6:
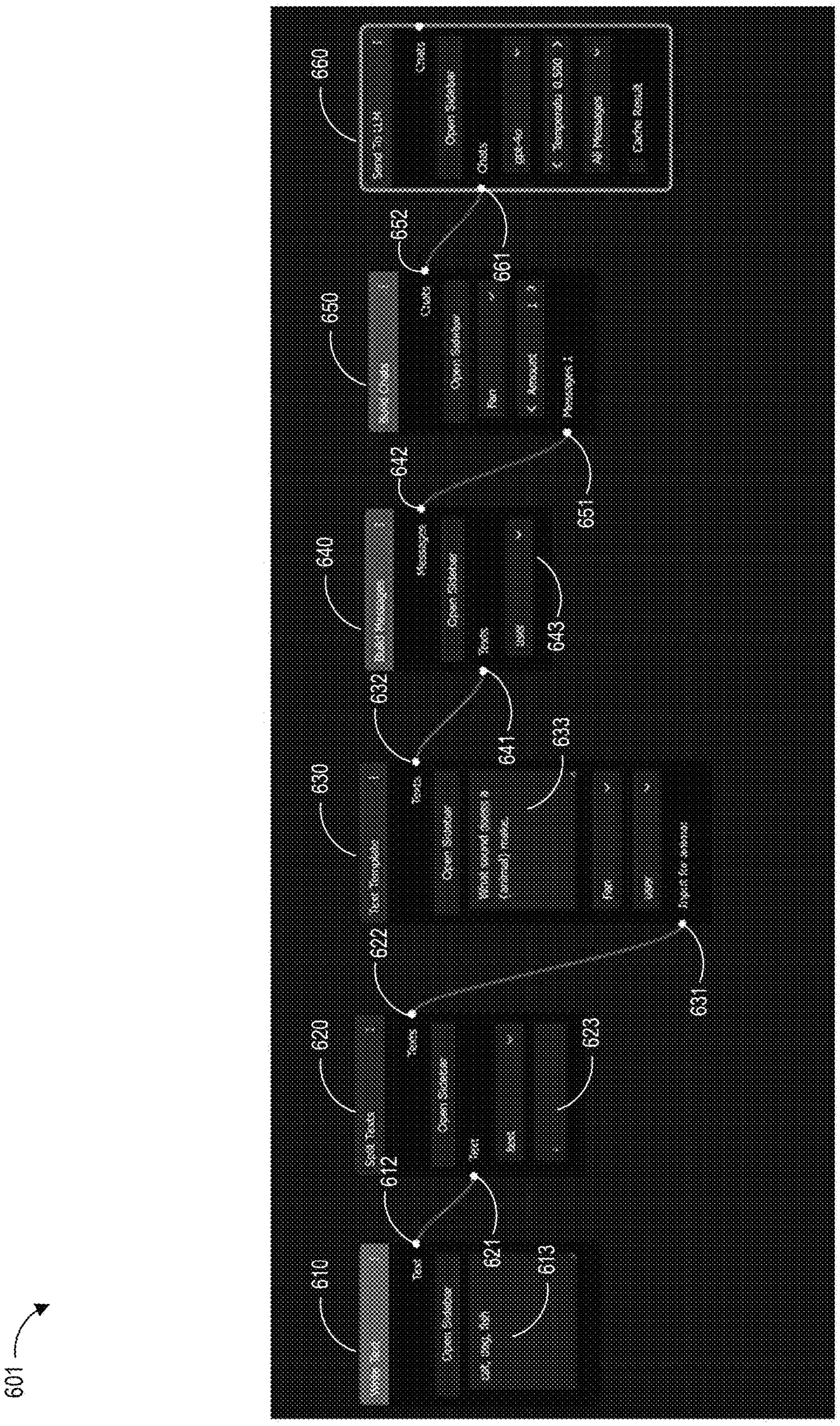
FIG. 6 is a depiction of an illustrative user interface displaying parallel processing of the AVD system, in accordance with aspects of the present application.

FIG. 6 is a depiction of an illustrative user interface 601 displaying parallel processing of the AVD system 120, in accordance with aspects of the present application. In some embodiments, a version of a flow 292 of an AVD system 120 may process multiple chats in multiple parallel instances simultaneously (or substantially simultaneously) to produce parallel content 296 as output 190. This capability of an AVD system 120 may be referred to as "parallelism." The example user interface 601 illustrates the concept of parallelism in an AVD system 120. Namely, the example user interface 601 demonstrates three chats submitted in parallel by the AVD system 120 to an LLM for parallel processing in order to generate three content outputs in parallel.

As used herein, the term "simultaneously" is used according to its usual and customary meaning in computing and networking, and refers to the effectively contemporaneous nature of the events being described. In computing environments, different events within a single computing device (or events in different locations on a network) rarely occur at exactly the same time. There may be an offset in timing due to latencies inherent in communications, computer processing, and the like. Thus, the term "simultaneously" does not necessarily equate to "exactly the same time," but rather the observed effect of two or more events occurring at approximately the same time for practical purposes and when factoring in communication and processing. Thus the concept of "simultaneously" is referred to herein as "substantially simultaneously."

Like the examples in FIGS. 3A and 3B, FIG. 6 depicts an illustrative user interface 601 that displays interactive graph-based representations of functions 150. The illustrative flow in user interface 601 includes functions 610, 620, 630, 640, 650, and 660 arranged to execute such that the operation of some functions depends on the output or other processing by other functions. For example, the first function, function 610, is a write text function that receives text 613 from a user. Function 610 provides an output 612 of the "text" data type, which corresponds to a text string in this example. In this example, the user writes a comma-separated text string of three animals: "cat, dog, fish." In the example of FIG. 6, the text 613 (e.g., three animals) will be processed in parallel to produce output representing the sound each animal makes.

As the example of FIG. 6 continues, the output 612 of function 610 has been connected to the input 621 of function 620. Function 620 splits the input 621 it receives (e.g., "cat, dog, fish" according to a user-specified delimiting character 623. In this example, the user-specified delimiting character 623 is a comma. Thus, the output 622 of function 620 is multiple text strings, each representing an animal: "cat", "dog", "fish." This output 622 is supplied as input 631 to function 630, which supplies each input into the text string 633 (e.g., "what sound does an {animal}make?"). Thus, the output 632 of function 630 is three text strings: "What sound does a cat make?" and "What sound does a dog make?" and "What sound does a fish make?". Each of these three text strings in the output 632 are provided in parallel as input 641 to the build messages function 640, which is a text template function that interpolates text input 641 into message output 642.

As previously discussed, in some embodiments, building a message involves assigning a role (e.g., user, system, assistant) to text. Thus in function 640, a dropdown menu provides a role selection 643, which in this case has been set to "user" to represent that the original text 613 (e.g., "cat, dog, fish") was provided by the user as input. Having assigned the role of user to each text input 641 (What sound does a cat make?" and "What sound does a dog make?" and "What sound does a fish make?"), the function 640 generates messages out of each string and provides the messages as output 642.

In some embodiments, the functions and other components (e.g., LLMs) are stateless (e.g., they do not maintain memory from invocation-to-invocation). To maintain context, the entire conversation history thus far may be included each time a new message is produced for processing. This complete sequence lets the LLM see all previous context and generate responses that reflect the ongoing dialogue. Moreover, each message may have a specific conversational role, allowing the LLM to track the sources of information in the conversation: a system message directs the LLM's behavior, much like a director instructing an actor; a user message originates as part of the back-and-forth conversation; an assistant message comes from the LLM (e.g., an agent).

At function 650, each message in the output 642 is provided as input 651 to function 650. Function 650 is a Build Chat function that instantiates messages as chats and submits the chats to an LLM for parallel processing. Although the example in FIG. 6 is simple and in this case is building chats with just a single message, more complex chats could be built in other examples with many messages creating context for an LLM. Thus, function 650 generates three chats as output 652 and provides each of the three chats for parallel processing at function 660.

Function 660 is a Send to LLM function that receives a chat as input 661 and then provides it to an LLM for processing. In this case, three chats would be sent by function 660 in parallel, each prompting the LLM to provide an animal sound for the three respective animals. The LLM would in turn provide parallel outputs into each chat (e.g., "meow", "bark", and "bubbles"). In this way, the user is not restricted to working with just one element (e.g., animal) at a time. Multiple elements may be run at once and combined in different ways to create a desired result. Each chat maintains its own context, ensuring that the flow processes every dialogue independently while following the same logical steps.

Figure 7:
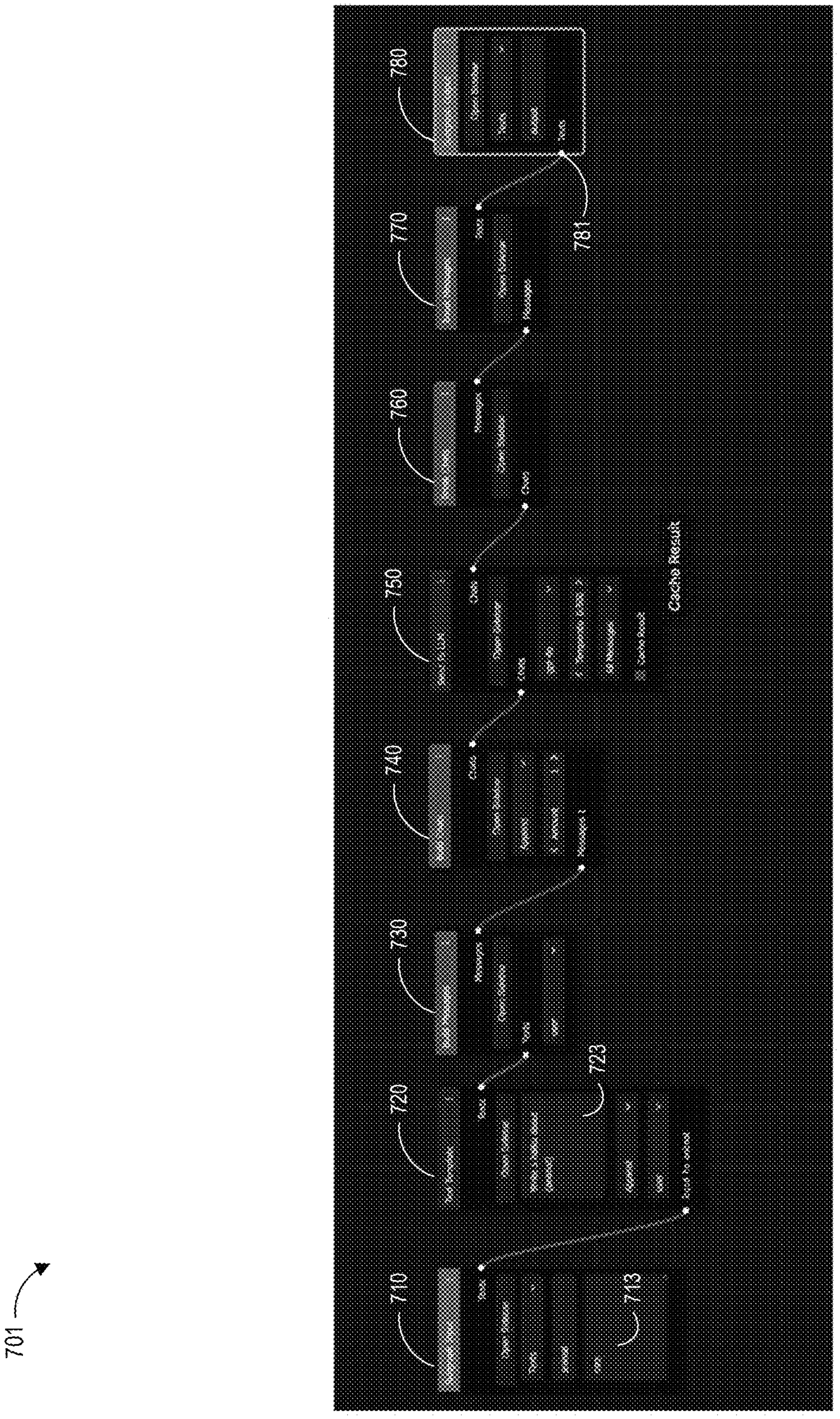
FIG. 7 is a depiction of an illustrative user interface displaying visual development in an AVD system made accessible through an application programming interface, in accordance with aspects of the present application.

FIG. 7 is a depiction of an illustrative user interface 701 displaying visual development in an AVD system 120 made accessible through an application programming interface, in accordance with aspects of the present application. Namely, FIG. 7 is a variation of the haiku function described in FIG. 3B, but is depicted here to demonstrate the ability of an AVD system 120 to allow a designer working in a visual development environment to abstract away certain technical development details behind an AVD system 120 API. In illustrative user interface 701, functions are combined in such a way that a non-technical user has expressed their particular expertise in a visual flow that requests a haiku about a given animal type from the AVD 120 API. More specifically, it asks the user for an animal type, sends the animal type as a parameter to the AVD system 120 API via a graph, and then prints the resulting haiku. User interface 701 includes functions 710, 720, 730, 740, 750, 760, 770, and 780.

Function 710 is configured to receive text input 713 (e.g., "cats") programmatically via an API (e.g., as a parameter of a function call) instead of—or in addition to—interactively from a user, although the program or system calling function 710 via an API may receive the input interactively from a user. Function 710 provides the input to function 720, which inputs the text input 713 into a text template 723 (e.g., "Write a haiku about {animal}"). At function 720, flow 701 begins the process of generating a haiku according to animal input. Thus, the text string output to function 730 by function 720 is "Write a haiku about cats."

Function 730 thus receives the text "Write a haiku about cats", which it converts with a Build Messages function into a message. More specifically, function 730 assigns the role of "user" to the text string "write a haiku about cats" in order to output a user message, as discussed in the previous example in FIG. 6. This message is provided to the Build Chats function 740, which converts the user message into a chat, using the process previously discussed in FIG. 6. Function 740 provides this chat to the Send to LLM function 750, which submits the chat to the LLM so that the LLM can generate the requested animal haiku. When the LLM generates the haiku about cats, it returns the haiku about cats as an input to function 760, which reverses the operation of function 740, taking the chat and breaking it down into messages to be input into function 770. Function 770 in turn is a Break Messages function which breaks the messages it receives back into text (a reverse of function 730). This text is then provided via API text output as a haiku about cats. Notably, a non-technical domain expert may design the entire flow 701 depicted in FIG. 7 and expose it to others—including technical developers—via an API to do the desired processing within the flow they designed. This functionality may bridge the gap between domain knowledge and the software engineers implementing automation solutions with tools such as LLMs in the AVD system 120. For example, Table 1 below is an example of Python source code that may be used by a developer to invoke and execute the flow 701 depicted in FIG. 7 (named "animal_haiku"):

```
#!/usr/bin/env python3
from avd_api.user_graphs import UserGraphs
def main( ):
  """Main function to get animal input, execute graph, and
  print the haiku."""
  animal = input("Enter an animal type: "). strip( )
  if not animal:
print("No animal type provided.")
return
  # Initialize AVD user graphs with your username
  user_graphs = UserGraphs("user1")
  # Retrieve haiku graph by name.
  # Ensure account has a graph named "animal haiku".
  graph =
    user_graphs.get_graph_by_name("animal_haiku")
  if not graph:
    print("Graph 'animal_haiku' not found.")
    return
  # Prepare parameters: API expects animal type
  # in list under the key "animal".
  parameters = {"animal": [animal]}
  print("Sending animal type to AVD API for haiku")
  # Execute the graph synchronously.
  result = graph.execute(parameters)
  # Extract the haiku from the output.
  responses = result.last_responses( )
  if responses:
    haiku = responses[0].get_content( )
    print("\nGenerated Haiku:")
    print(haiku)
  else:
    print("No haiku returned from AVD API.")
```

Figure 8:
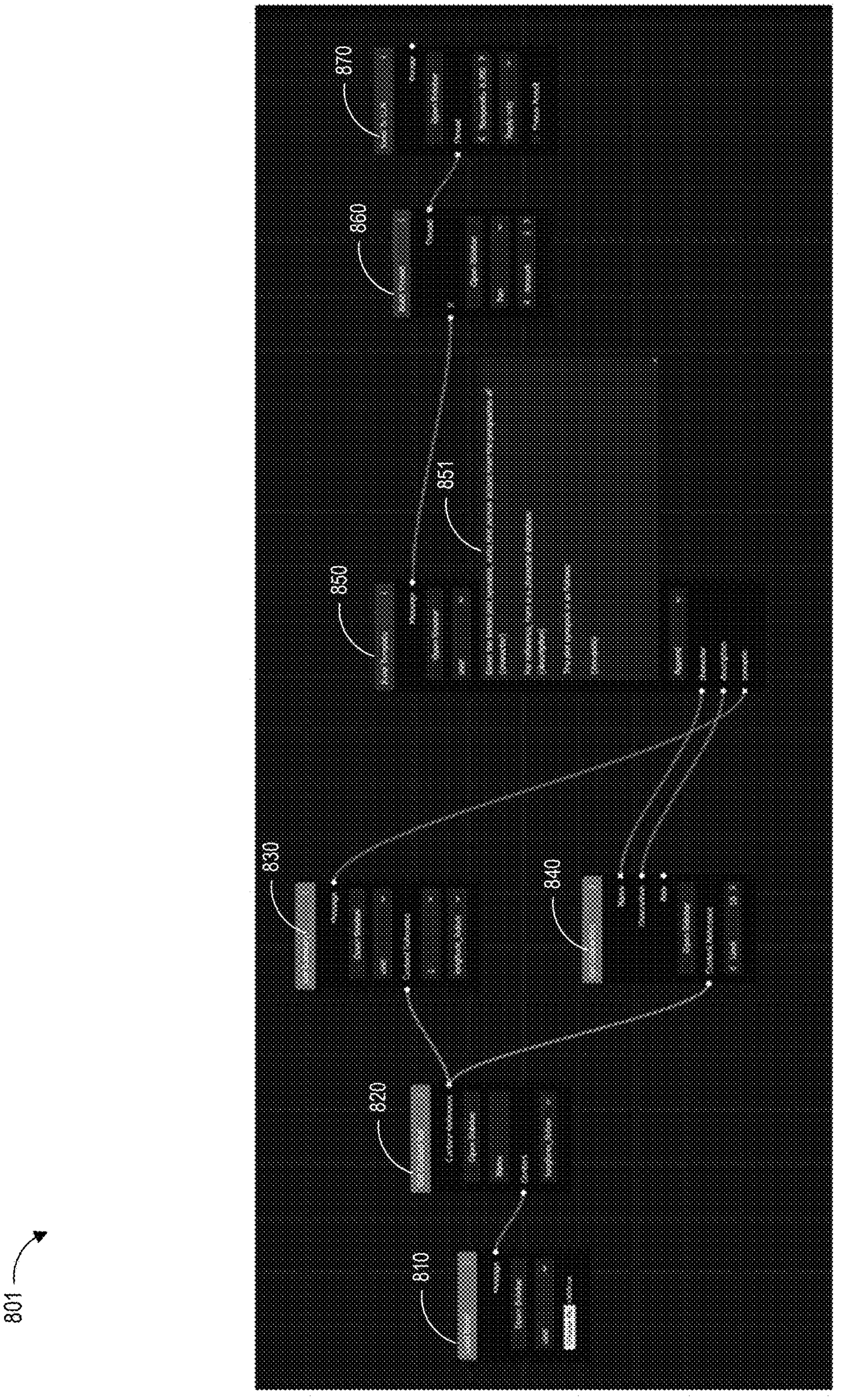
FIG. 8 is a depiction of an illustrative user interface displaying an example data transformation use case of the AVD system, in accordance with aspects of the present application.

FIG. 8 is a depiction of an illustrative user interface 801 displaying an example data transformation use case of the AVD system 120, in accordance with aspects of the present application. Traditional solutions for data transformation rely on users to interpret and organize data, and automated data transformations depend on rules to transform from unstructured to structured data. LLMs may handle inputs and outputs that combine structured and unstructured data, and thus, the AVD system 120 provides tools to manage data transformations without requiring a user to understand data structures, underlying processes, or rules for structuring data. The example in FIG. 8 shows a novel input to a flow and transformed into structured data. User interface 801 thus receives unstructured data in the form of a novel and transforms it as structured data for use in further AVD system 120 tasks, without requiring user understanding of data structures or other technical processes, and without requiring the user to program rules for structuring the data.

User interface 801 includes functions 810, 820, 830, 840, 850, 860, and 870. The Load Novel function 810 receives a novel uploaded as a text file by the user. Function 810 assigns the role of user to the text file, thus generating a user message (e.g., the novel) that is output to function 820. The Get Content Ref function 820 receives message content (e.g., the novel) and provides it as content reference input to two subsequent functions, function 830 and function 840. Function 830 is a Get Summary function that provides a summary of the content (in this case, the novel) as a message input to function 850. Additionally, function 840 is a Get Characters function that provides the name and description (e.g., of a character) to function 850. As examples of the Get Summary and Get Characters functions have already been discussed elsewhere in this disclosure, they will not be repeated here. Function 850 is a Build Template function that receives a character, description, and synopsis as input into a more detailed templatized prompt 851. The template built by function 850 (e.g., requesting a first person account from the perspective of a character in the novel given the character's description and a synopsis of the plot) is provided as a message to the Build Thread function 860. Function 860 builds a thread with the message template and provides the thread as input to function 870, which in turn provides the thread to an LLM for inference generation. In this way, the AVD system 120 has processed the novel input and begun automatically generating inferences and intelligence about the novel without requesting data transformation instructions from a user. Instead, the AVD system can receive content in the flexible form of messages and break it into the relevant pieces needed for analysis.

Example Computing System

Figure 9:
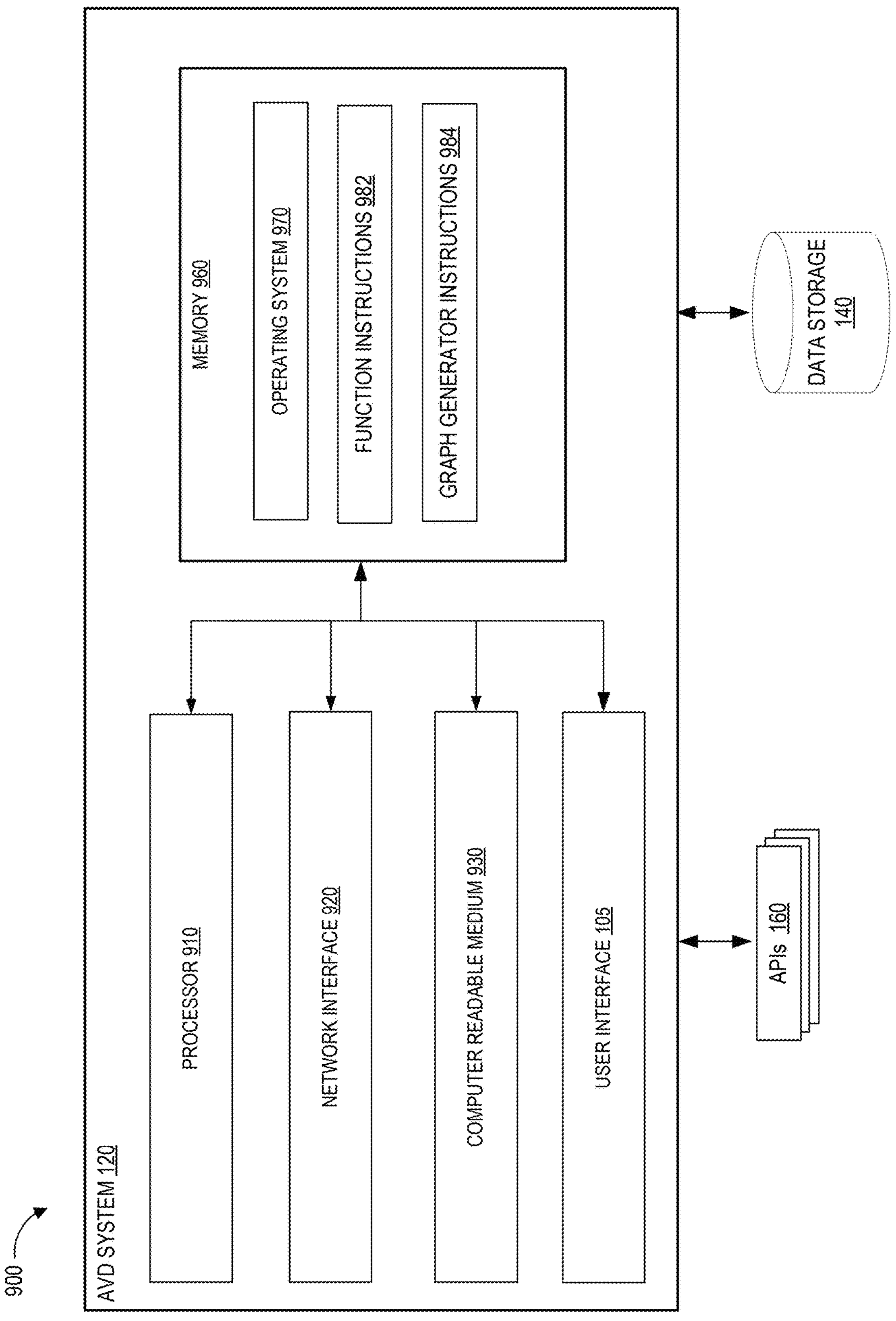
FIG. 9 is a block diagram of an illustrative architecture of an AVD system, in accordance with aspects of the present application.

FIG. 9 depicts an example architecture of a computing system 900 that can be used to perform one or more of the techniques described herein. The general architecture of the computing system 900 depicted in FIG. 9 includes an arrangement of computer hardware and software modules that may be used to implement one or more aspects of the present disclosure. The computing system 900 may include many more (or fewer) elements than those shown in FIG. 9. As illustrated, the computing system 900 includes a processor 910, a network interface 920, a computer-readable medium 930, and a user interface 105, all of which may communicate with one another by way of a communication bus. The network interface 920 may provide connectivity to one or more networks or computing systems. The processor 910 may thus receive information and instructions from other computing systems or services via a network (e.g., connecting the computing system 900 and the environment 100).

The processor 910 may also communicate with memory 960. The memory 960 may contain computer program instructions (grouped as modules or units in some embodiments) that the processor 910 executes in order to implement one or more aspects of the present disclosure. The memory 960 may include random access memory (RAM) or other volatile memory, read only memory (ROM) or other persistent memory, or any other auxiliary, or non-transitory computer readable media. For example, the memory 960 may store an operating system 970 that provides computer program instructions for use by the processor 910 in the general administration and operation of the computing system 900. The memory 960 may further include computer program instructions and other information for implementing one or more aspects of the present disclosure. For example, in one embodiment, the memory 960 includes a user interface module that generates user interfaces (and/or instructions therefor) for display upon a user computing device, e.g., via a navigation and/or browsing interface such as a browser or application installed on the user computing device.

In addition to and/or in combination with the operating system 970, the memory 960 includes instructions for various hardware components of the present disclosure, including function instructions 982 and graph generator instructions 984. Further, storage for functionality of the AVD system 120 may be found in the data storage 140. External APIs 160 may communicate with the AVD system 120.

While the AVD system 120 is shown in FIG. 9 as part of the computing system 900, in other embodiments, all or a portion of the AVD system 120 may be implemented by another computing device. For example, in certain embodiments of the present disclosure, another computing device in communication the computing system 900 may include several modules or components that operate similarly to the modules and components illustrated as part of the computing system 900. In some instances, the AVD system 120 may be implemented as one or more virtualized computing devices. Moreover, the AVD system 120 may be implemented in whole or part as a distributed computing system including a collection of devices that collectively implement the functions discussed herein.

Terminology and Additional Considerations

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method (including computer-implemented method), process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:

presenting, on a user computing device, a graphical user interface that includes a system builder graphical user interface and a graph viewer, the graphical user interface being configured to provide interactive control over configuring a flow comprising a plurality of functions and connections therebetween, wherein the graphical user interface enforces matching of data types for output of a function to be input into another function;

receiving, via the graphical user interface, input comprising creative direction and selection of a first function from among a plurality of functions to serve as a first function of the flow;

receiving, via the graphical user interface, user specifications to customize the first function;

receiving, via the graphical user interface, selection of a second function from among the plurality of functions to serve as a second function of the flow, and configuring the flow such that output of the first function becomes input to the second function based at least in part on the enforced matching of data types;

generating a first workflow version of the flow comprising the first function and the second function;

executing the first workflow version to generate a first sample of content, wherein at least one function of the first workflow version executes a generative artificial intelligence model to generate nondeterministic output;

generating, by a graph generator, a first graphical representation of the first workflow version, wherein the first graphical representation comprises a graph-based representation that includes a plurality of nodes representing entities in the flow and a plurality of edges representing relationships between the plurality of nodes; and storing, in data storage, graph data defining the graph-based representation, wherein the graph-based representation records version state information for the first workflow version and records an iteration corresponding to executing the first workflow version to generate the first sample of content.

2. The computer-implemented method of claim 1, wherein the enforced matching of data types comprises: a fixed, non-extendable set of high-level data types including at least text, image, audio, and video.

3. The computer-implemented method of claim 1, wherein the at least one function that executes a generative artificial intelligence model is selected at runtime from among: a plurality of different generative artificial intelligence models.

4. The computer-implemented method of claim 1, wherein executing the first workflow version comprises setting a temperature parameter for the generative artificial intelligence model to control a degree of nondeterminism.

5. The computer-implemented method of claim 1, further comprising, prior to executing the first workflow version, performing a dry run that validates type correctness without invoking external models or application programming interfaces.

6. The computer-implemented method of claim 1, wherein executing the first workflow version comprises submitting multiple instances of at least one function for parallel processing to generate a plurality of samples of content substantially simultaneously.

7. The computer-implemented method of claim 1, wherein storing the graph data comprises storing checkpoint data for at least one intermediate function output to enable re-execution of downstream functions from the checkpoint.

8. The computer-implemented method of claim 1, further comprising registering the first workflow version as a reusable function callable via an application programming interface.

9. The computer-implemented method of claim 1, wherein receiving the user specifications comprises applying profile data associated with the user to parameterize one or more functions of the first workflow version.

10. The computer-implemented method of claim 1, wherein the graph-based representation further comprises subgraph version state nodes that maintain version histories of user-defined functions invoked by the first workflow version.

11. The computer-implemented method of claim 1, further comprising:

displaying, on the graphical user interface, the first workflow version, the first graphical representation, and the first sample of content;

receiving, via the graphical user interface, second input comprising additional creative direction to edit the flow;

based on the second input, generating a second workflow version of the flow that is different from the first workflow version;

executing the second workflow version to generate a second sample of content;

updating the graph-based representation to include a second version state for the second workflow version and an additional iteration corresponding to executing the second workflow version to generate the second sample of content; and enabling return to a prior version state or a prior iteration using the graph-based representation such that additional nondeterministic output is generated based on the prior version state or the prior iteration and not a most-recently generated version state or iteration.

12. A system comprising:

computer-readable memory storing executable instructions; and a processor in communication with the computer-readable memory and programmed by the executable instructions to:

receive, at a graphical user interface, first input comprising creative direction to build an artificial intelligence (AI)-based workflow;

based on the first input, generate a first workflow version of the AI-based workflow comprising a plurality of functions;

generate a first graphical representation of the first workflow version;

generate a first sample of content with the first workflow version;

display, on the graphical user interface, the first workflow version, the first graphical representation, and the first sample of content;

receive, at the graphical user interface, second input comprising additional creative direction to edit the AI-based workflow;

based on the second input, generate a second workflow version of the AI-based workflow;

generate a second graphical representation of the second workflow version;

generate a second sample of content with the second workflow version; and display, on the graphical user interface, the second workflow version, the second graphical representation, and the second sample of content.

13. The system of claim 12, wherein the AI-based workflow comprises at least one of the following:

a nondeterministic AI-based software application;

a nondeterministic AI-based program to generate creative content;

configuration data for an AI-based application; or a nondeterministic AI-based system for a creative task.

14. The system of claim 12, wherein the processor is further programmed by the executable instructions to:

receive third input to edit the first workflow version of the AI-based workflow;

based on the third input, generate a third workflow version of the AI-based workflow, wherein the third workflow version is different from the second workflow version;

generate a third graphical representation of the third workflow version;

generate a third sample of content with the third workflow version; and display, on the graphical user interface, the third workflow version, the third graphical representation, and the third sample of content.

15. The system of claim 12, wherein the processor is further programmed by the executable instructions to:

generate a third sample of content with the first workflow version;

generate a fourth sample of content with the first workflow version; and receive a preferred sample of content from the first workflow version of the AI-based workflow from among the first sample of content, the third sample of content, and the fourth sample of content.

16. The system of claim 12, wherein the processor is further programmed by the executable instructions to store the AI-based workflow as a new preprogrammed function.

17. The system of claim 12, wherein the content comprises entertainment content, wherein entertainment content includes movies, books, media, songs, electronic games, television shows, augmented reality experiences, podcasts, or any subtask related to the generation of entertainment content.

18. The system of claim 12, wherein the graphical representation of the AI-based workflow comprises a tree graph including:

a plurality of nodes representing entities in the AI-based workflow, wherein the plurality of nodes include the plurality of functions applied as part of the AI-based workflow; and a plurality of edges representing relationships between the plurality of nodes.

19. A computer-implemented method comprising:

under control of a computing system comprising one or more computer processors configured to execute specific instructions, presenting a graphical user interface configured to provide interactive control over configuring a workflow comprising a plurality of functions, wherein the graphical user interface enforces matching of data types for output of a function to be input into another function; and wherein at least one function of the plurality of functions executes a generative artificial intelligence (AI) model to generate nondeterministic output;

generating a graph-based representation of the workflow, wherein the graph-based representation includes a plurality of versions of the workflow and a plurality of iterations of executing the workflow; and enabling return to a prior version or iteration of the workflow using the graph-based representation such that additional nondeterministic output is generated based on the prior version or iteration of the workflow and not a most-recently generated version or iteration of the workflow.

20. The computer-implemented method of claim 19, further comprising:

receiving, via the graphical user interface, a user selection to pin an output of a function of the workflow;

storing pinned output data for the function with the graph-based representation;

deactivating re-execution of the function and one or more upstream functions during a subsequent execution of the workflow; and executing one or more downstream functions using the pinned output data as input to generate additional nondeterministic output.

* * * * *